United States Patent [19]

Vornberger

[11] E Re. 29,005

[45] Reissued Oct. 19, 1976

[54] METHOD AND MACHINE FOR CEMENT LASTING

[75] Inventor: Walter Vornberger, Tewksbury, Mass.

[73] Assignee: International Shoe Machine Corporation, Nashua, N.H.

[22] Filed: Feb. 12, 1976

[21] Appl. No.: 657,437

Related U.S. Patent Documents

Reissue of:

[64] Patent No.: 3,831,216
Issued: Aug. 27, 1974
Appl. No.: 386,129
Filed: Aug. 6, 1973

[52] U.S. Cl. ..... 12/145; 12/12; 118/256

[51] Int. Cl.[2] ..... A43D 21/00

[58] Field of Search ..... 12/7, 10, 1, 12, 142 R, 12/145, 12.4; 118/256, 200, 410, 7, 3, 411

[56] References Cited

UNITED STATES PATENTS

| | | | |
|---|---|---|---|
| 3,035,287 | 5/1962 | Vlcek et al. | 12/12.4 |
| 3,251,081 | 5/1966 | Springer | 12/142 R |
| 3,477,079 | 11/1969 | Bergeron et al. | 12/145 |
| 3,685,072 | 8/1972 | Schindler et al. | 12/12 |
| 3,691,575 | 9/1972 | Vornberger | 12/145 |

*Primary Examiner*—Patrick D. Lawson
*Attorney, Agent, or Firm*—Albert Gordon

[57] ABSTRACT

A lasting machine that applies cement into the corner between a portion of the margin of an upper mounted on a last and an insole located on the last bottom and that wipes the margin portion against the insole so as to cementatiously attach the wiped margin portion to the insole.

14 Claims, 23 Drawing Figures

FIG. 4
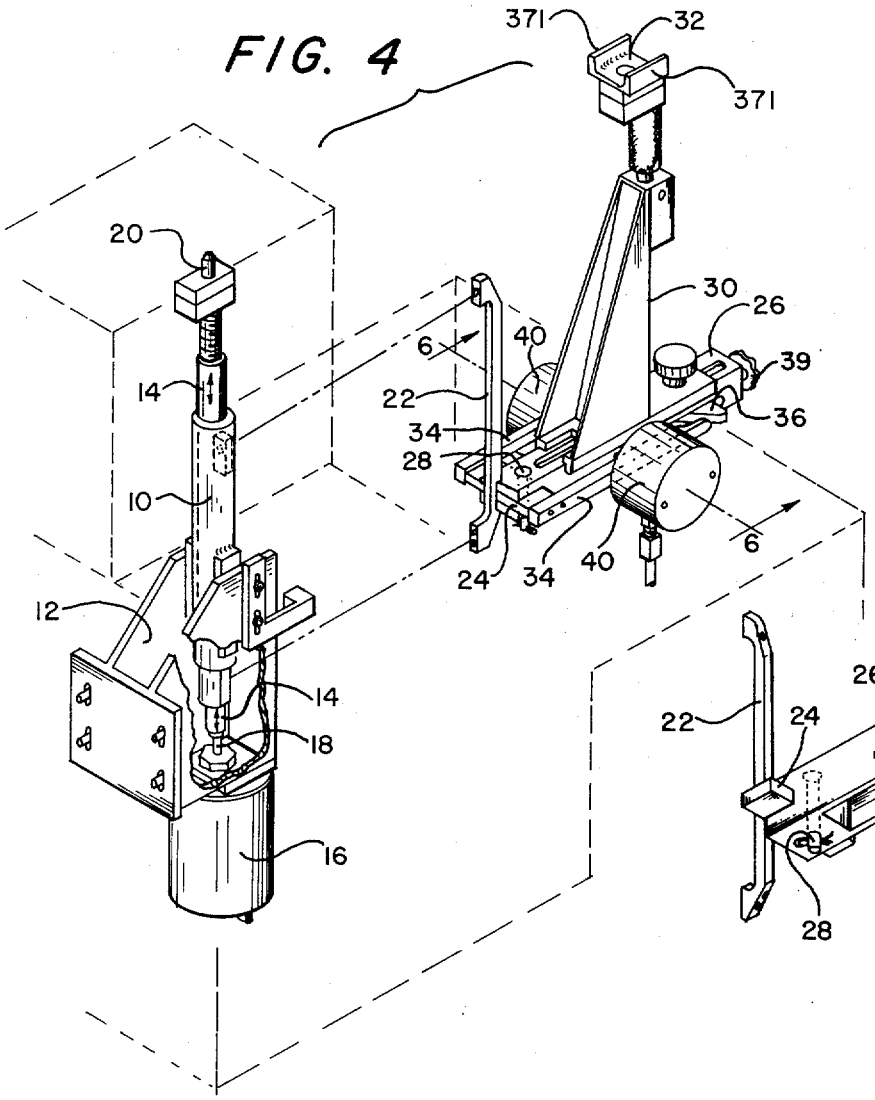
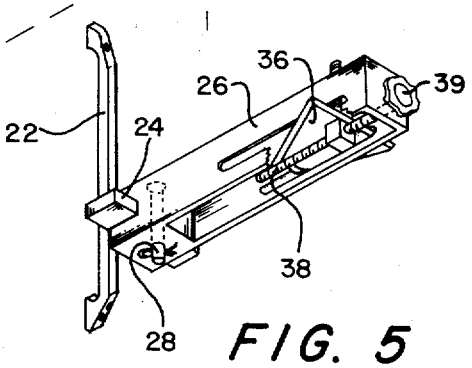
FIG. 5
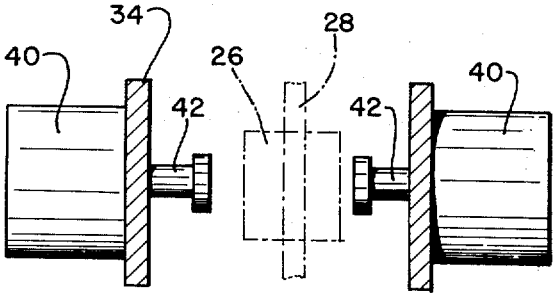
FIG. 6

256R
256L
442
402
408
406
404
398
400
396
394
500
392
390
496
494
498
414
416
412
40R
40L
436
438
440
142R
142L
474
476
478
480
482
506
434
388
492
448
490
504
430
502
486
410
356R
484
384
374
376
386
428
432
382
356L
378
426
380
424
70
166
453
452
448
446
469
444
450
449
468
466
374
202
462
460
458
456
454
464
470
472

METHOD AND MACHINE FOR CEMENT LASTING

Matter enclosed in heavy brackets [ ] appears in the original patent but forms no part of this reissue specification; matter printed in italics indicates the additions made by reissue.

BACKGROUND AND SUMMARY OF THE INVENTION

This invention is directed to improvements over the cement lasting machine disclosed in U.S. Pat. applications Ser. No. 227,376, filed Feb. 18, 1972, now U.S. Pat. No. 3,775,797 and Ser. No. 325,701, filed Jan. 22, 1973 now U.S. Pat. No. 3,758,904.

The aforementioned machine includes an arrangement for supporting bottom-up a shoe assembly formed of a last having an upper mounted thereon and an insole located in its bottom with the opposite side portions of the upper margin extending upwardly of the insole. Lasting instrumentalities on each side of the support arrangement are caused to first engage the opposite side portions of the upper and then wipe the margins of these upper portions against the insole. The lasting instrumentalities are each mounted for inward-outward movement on a base, and the bases are located on opposite sides of and outwardly of the support arrangement with each base also being mounted for inward-outward movement. Initially each base is located in an outer position with respect to the support arrangement, so that the shoe assembly can be readily placed on the support arrangement, and each lasting instrumentality is in an outer position with respect to its associated base. The bases are then moved inwardly, together with the lasting instrumentalities, to inner base positions wherein the lasting instrumentalities are close to but not in engagement with the sides of the shoe assembly. This is followed by a movement of the lasting instrumentalities inwardly of their outer positions on the bases so as to enable them to engage the opposite side portions of the upper and wipe the upper margin portions against the insole.

In the aforementioned machine, the lasting instrumentalities, when the bases have completed their inward movement, must always be disengaged from the shoe assembly and spaced a desired close distance from the shoe assembly. With the support arrangement of the aforementioned machine, each lasting instrumentality, when its associated base has completed its inward movement, will be a different distance from the shoe assembly or may actually engage the shoe assembly depending on whether the shoe assembly is for a right foot or for a left foot due to the differences in the asymmetrical constructions of the left foot and the right foot shoe assemblies. In order to overcome this difficulty and to insure that the lasting instrumentalities are spaced the desired distance from the sides of the shoe assembly regardless of whether a left foot shoe assembly or a right foot shoe assembly is being operated on, the machine, in accordance with a first aspect of this invention, has been improved by providing a mechanism for selectively moving the part of the support arrangement that supports the toe portion of the shoe assembly laterally in one of two opposite lateral directions.

In the aforementioned machine, the wiping of the opposite side portions of the upper margin against the insole is performed by lasting tools or straps that first apply relatively light back-up forces to the margin portions to fold them part way toward the insole. After this, cement nozzles are caused to travel along the sides of the insole periphery and outwardly thereof to the extent permitted by the margin portions, which are backed up by the lasting tools or straps, and to apply cement into the corners between the margin portions and the insole periphery. This is followed by causing the lasting tools or straps to apply relatively heavy wiping forces to the margin portions to wipe the margin portions against the insole and attach them to the insole by way of the cement. The purpose of having the margin portions folded part way toward the insole during the travel of the nozzles and the extrusion of cement through the nozzles is to cause the folded margin portions to create a barrier between the upper margin and the insole that inhibits the creeping of cement between the margin and the insole and then between the upper and the sides of the last. Shoe assemblies are so constructed that one side of the shoe assembly has a relatively pronounced reentrant portion and the other side of the shoe assembly has a less pronounced reentrant portion. The side of the shoe assembly having the relatively pronounced reentrant portion is different for left foot shoe assemblies and right foot shoe assemblies. The angle formed between the side of the last and the bottom of the last on the side of the shoe assembly having the relatively pronounced reentrant portion is an acute angle which is smaller than the angle, which is close to a right angle, formed between the other side of the last and the bottom of the last. Therefore, the folding of the upper margin part way towards the insole on the side of the shoe assembly having the relatively pronounced reentrant portion is needed to create the barrier between the upper margin and the insole while this folding is not needed to create the barrier on the other side of the shoe assembly. Moreover the folding of the margin part way toward the insole on the side of the shoe assembly having the less pronounced reentrant portion tends to prevent the nozzle traveling along this side of the shoe assembly from reaching the periphery of the insole in the corner in which it is traveling which is undesirable for the subsequent cementatious attachment of the upper margin to the insole. In order to overcome this problem, in a second aspect of the invention only the lasting tool or strap on the side of the shoe assembly having the relatively pronounced reentrant portion is caused to apply the relatively light back-up force to fold the upper margin part way toward the insole.

The aforementioned machine is intended to operate on a shoe assembly in which the upper margin of at least one end portion of the shoe has been wiped against the insole and to apply cement by a nozzle along a course of the upper margin that extends rearwardly of a boundary between an unwiped upper margin portion and the wiped end margin portion. The nozzle is connected to a yieldable drive means to effect forward-rearward movement of the nozzle and is caused to be located in a starting position in the corner between the unwiped margin portion and the corresponding portion of the insole periphery a particular distance rearward of the boundary. The drive means is then released to move the nozzle forwardly while the nozzle stays in the corner until the nozzle arrives at the boundary. Concomitantly with the arrival of the nozzle at the boundary, a reversing mechanism is actuated to cause the drive means to move the nozzle rearwardly while the nozzle stays in the corner and to cause cement to be extruded from the nozzle during its rearward movement. With this arrangement, the particular distance between the starting position and the boundary varies in accordance with the length of the shoe assembly and the forward-rearward location of the actuator for the reversing mechanism therefore has to be adjusted for each shoe assembly length.

In a third aspect of the invention, the inconvenience referred to at the end of the preceding paragraph is overcome by actuating the reversing mechanism a predetermined time after the drive means is released which time is equal to or greater than the minimum time it takes for the nozzle to move forwardly from the starting position to the boundary. Should the nozzle arrive at the boundary before the reversing mechanism is actuated, it will pause at the boundary, due to meeting resistance to forward movement at the boundary and due to its being driven forwardly by a yieldable drive means, until the reversing mechanism is actuated.

Each lasting instrumentality of the aforementioned machine is comprised of a plurality of separated side by side heightwise extending straps. In the machine operation, the lasting straps are caused to so engage the shoe assembly that a top segment of each strap extends upwardly of the insole and outwardly of a portion of the upper margin. A nozzle is then caused to travel along the insole periphery while yieldable downward and outward forces are applied to the nozzle and cement is extruded through the nozzle to cause the nozzle to bear against the insole and the margin portion and to enable cement to be extruded into the corner between the margin portion and the insole. After this, the nozzle is moved inwardly of the margin and upwardly of the insole and the top segments of the lasting straps are folded downwardly and inwardly against the insole to wipe the margin portion against the insole and attach it to the insole by way of the cement. Due to the separation between the lasting straps, the nozzle has a tendency to snag and get caught in the separation between the lasting straps and not move smoothly along the upper margin. In a fourth aspect of the invention, this difficulty is overcome by making that portion of the lasting straps that extend upwardly of the bottom of the insole when the lasting straps engage the shoe assembly integral instead of separated.

BRIEF DESCRIPTION OF THE DRAWINGS

FIG. 4 is an exploded isometric view of a portion of the support arrangement of the machine;

FIG. 5 is an isometric view of a portion of the support arrangement;

FIG. 6 is a view taken along the line 6 — 6 of FIG. 4;

DESCRIPTION OF THE PREFERRED EMBODIMENT

Figure 1:
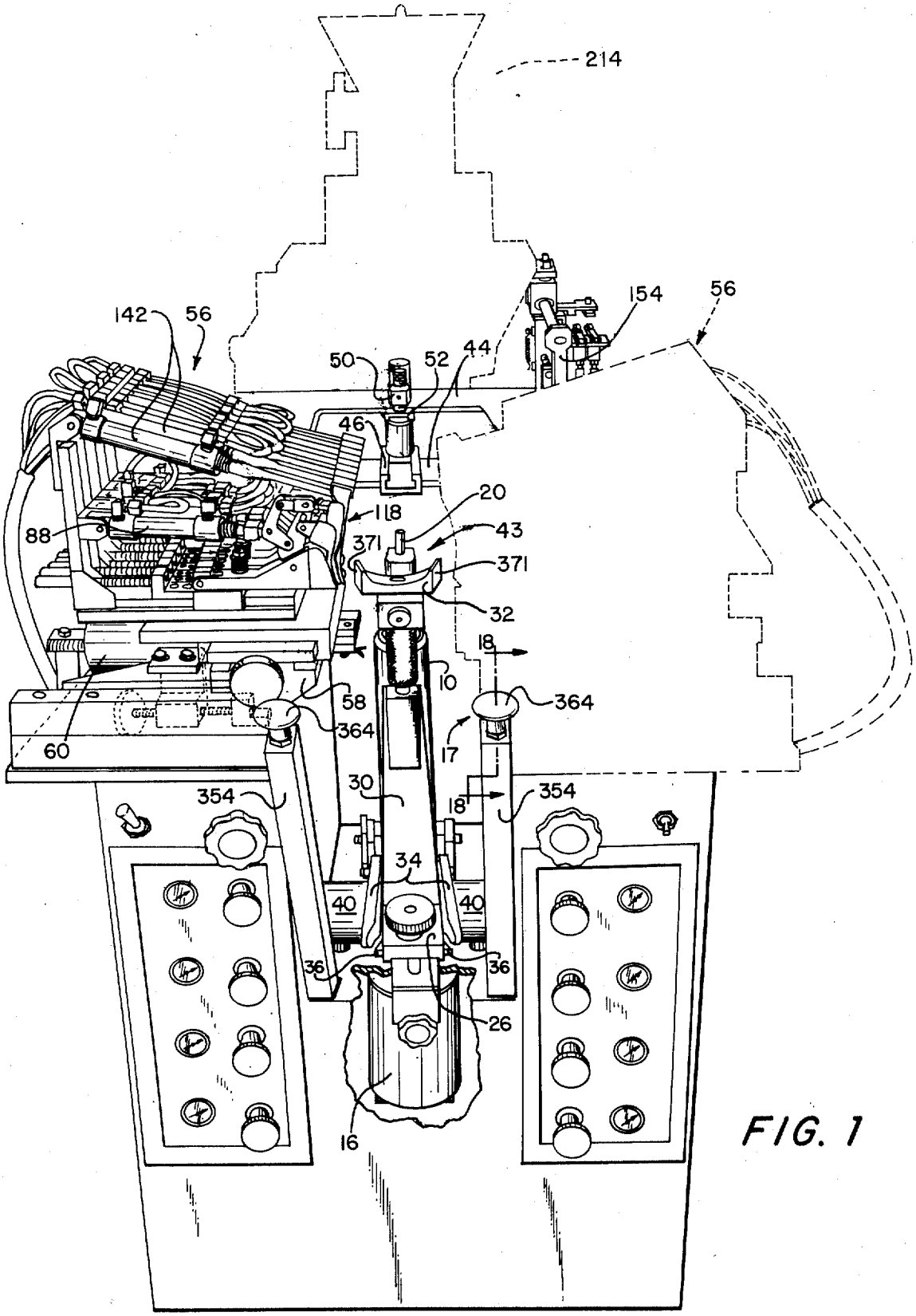
FIG. 1 is an isometric view of the machine taken from the front of the machine.
Figure 3:
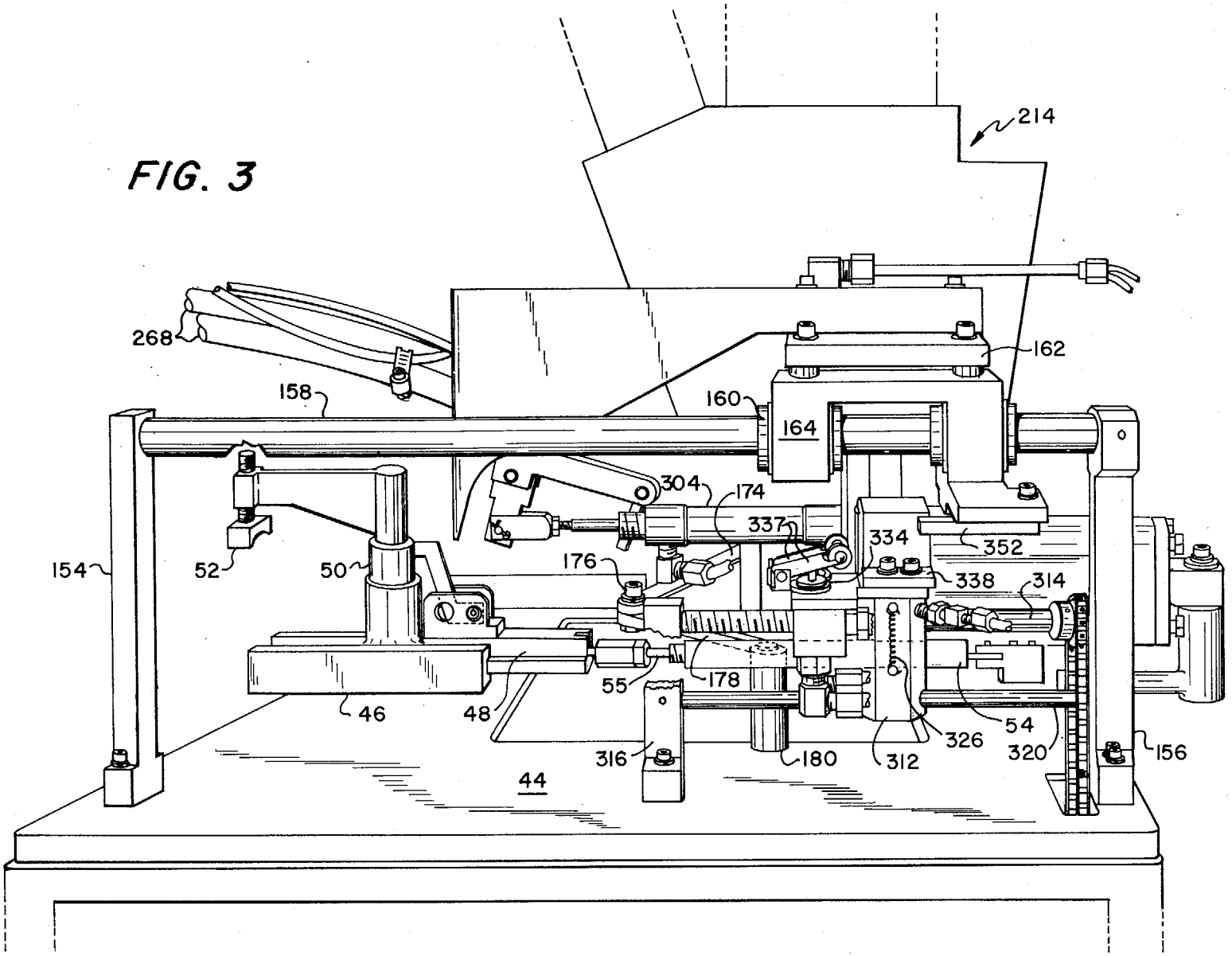
FIG. 3 is an isometric view, taken from a side of the machine, of a cement applying mechanism of the machine.

The operator is intended to stand in front of the machine as seen *in* FIG. 1 and to the left of the machine as seen in FIG. 3. Directions extending toward the operator (right to left in FIG. 3) will be designated as "forward" and directions extending away from the operator (left to right in FIG. 3) will be designated as "rearward." The front of the machine is closest to the operator and the back of the machine is furthermost from the operator.

Referring to [ the ] FIGS. 1 and 4, the machine includes a sleeve 10 that is fixedly mounted to a stationary bracket 12. A bar 14 is movably mounted in the sleeve 10 for heightwise movement. An air operated motor 16, that is secured to the bracket 12, has an upwardly extending piston rod 18 that is secured to the bottom of the bar 14, whereby the motor 16 can effect heightwise movement of the bar 14. A last pin 20 is mounted to the top of the bar 14.

Referring to FIGS. 1 and 4 – 6, a bracket 22, secured to the front of the bar 14, has a plate 24 that is received in a clevis formed at the back of a mount 26. A pin 28 pivotally mounts the mount 26 to the plate 24 for lateral swinging movement about the heightwise extending axis of the pin 28. A column 30 is secured to and extends upwardly of the mount 26 and a toe rest 32 is mounted to the top of the column 30. The mount 26, the column 30 and the toe rest 32 form a toe rest assembly. The toe rest 32 is located in front of the last pin 20. A pair of wings 34 are secured to the sides of the plate 24 and extend forwardly thereof on opposite sides of the mount 26. A cam 36 is threaded onto a screw 38 that is rotatably mounted in the mount 26 so that the forward-rearward position of the cam 36 in the mount 26 can be adjusted by rotating a knob 39 that is secured to the front of the screw 38. The sides of the cam 36 are adapted to engage the wings 34 to limit the extent of swinging movement of the mount 26, together with toe rest 32, about the axis of the pin 28. An air actuated motor 40 is mounted to each wing 34 and each motor 40 has a piston rod 42 that extends toward the mount 26.

The last pin 20 and the toe rest 32 constitute a shoe support 43.

Referring to FIGS. 1 and 3, a platform 44, located rearwardly of the last pin 20, has a gib 46 secured thereto that slidably receives a slide 48 for forward-rearward movement. A mount 50 is secured to the slide 48 and a downwardly extending hold-down 52 is secured to the front of the mount 50. An air actuated motor 54, mounted to platform 44, has a piston rod 55, that is secured to the slide 48 whereby the motor 54 can effect forward-rearward movement of the hold-down 52.

Duplicate sets of lasting units 56 are located on opposite side of the shoe support 43, the left set of lasting units 56 in FIG. 1 being drawn in and only the outline of the right set of lasting units 56 being shown in FIG. 1.

Figure 2:
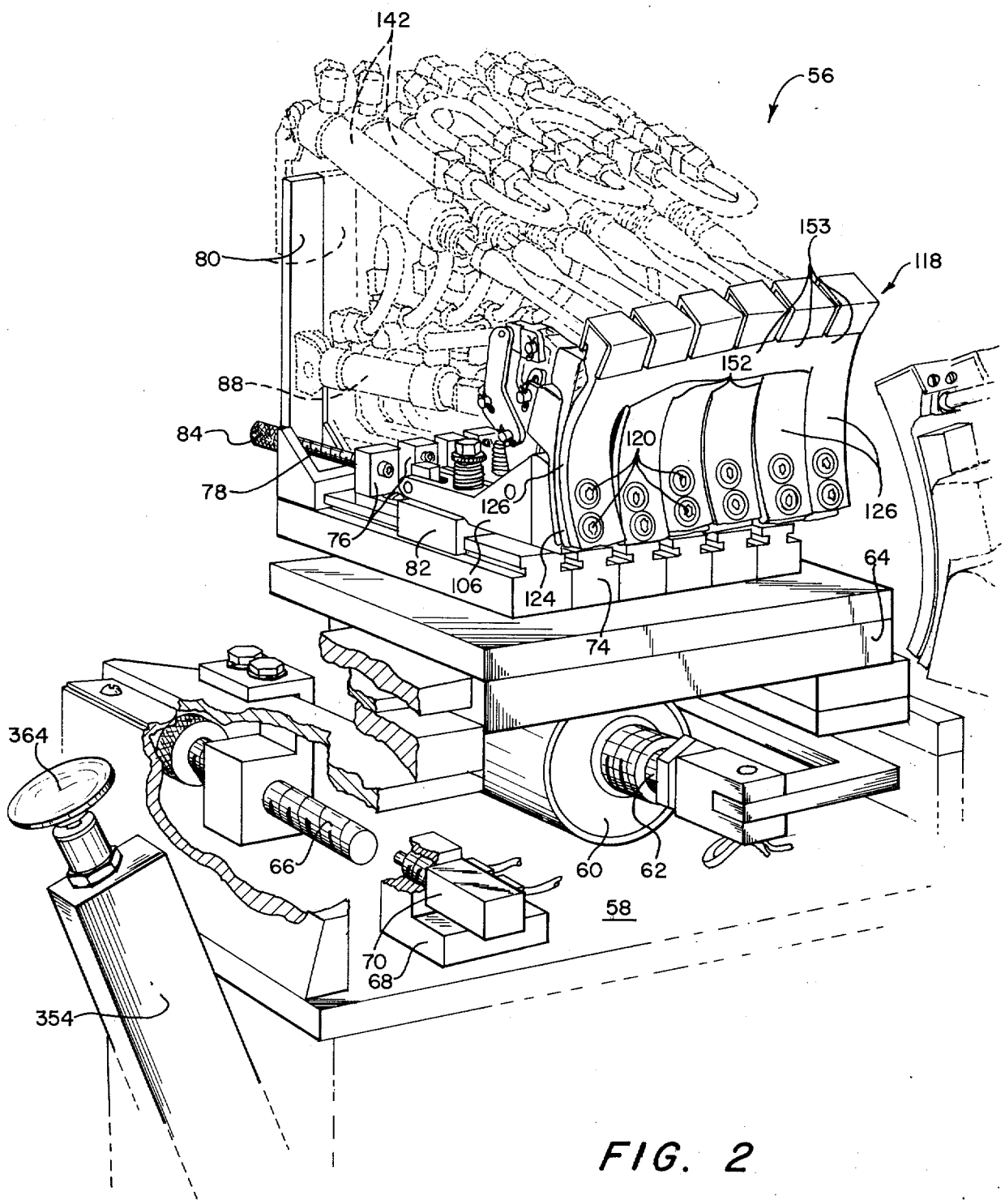
FIG.2 is an isometric view of the lasting instrumentalities of the machine.

Referring to FIGS. 1 and 2, each set of lasting units 56 is mounted for inward-outward movement on a table 58. An air actuated motor 60, mounted to each table 58, has a piston rod 62 that is secured to a base 64 of a set of lasting units 56 to thereby enable the motors 60 to effect inward-outward movement of the sets of lasting units 56. A bolt 66 is mounted to each base 64 so as to be in registry with a flange 68 mounted to each table 58 and in registry with a valve 70 mounted in each flange 68.

Figure 7:
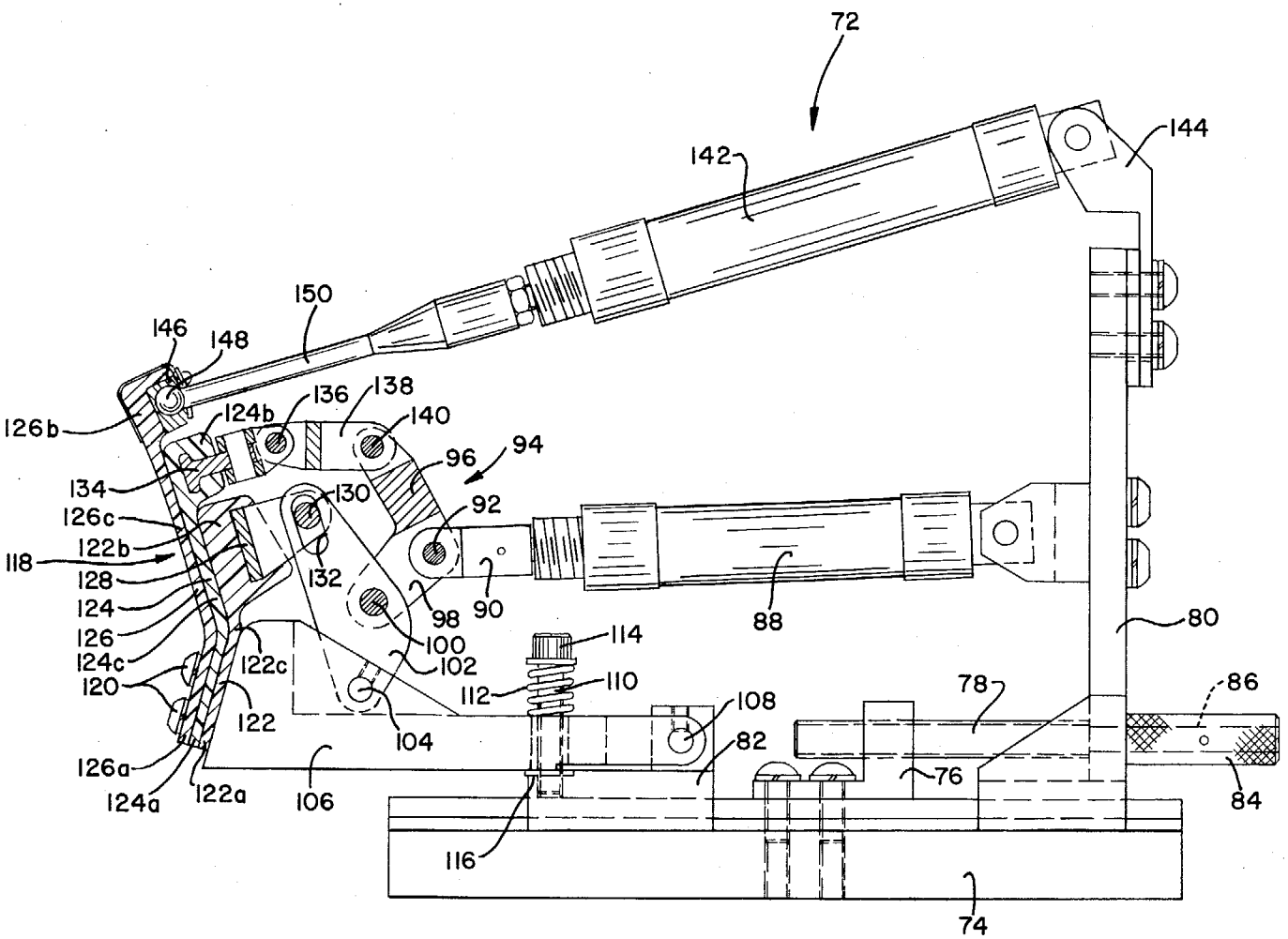
FIG. 7 is a partially sectional view of a lasting instrumentality.

Referring to FIGS. 2 and 7, each set of lasting units 56 is formed of a plurality of lasting units 72 located side by side that are mounted to a support 74 that is secured to and is located above a base 64. A flange 76 for each lasting unit 72 is secured to and extends upwardly of a support 74 and threadedly receives a bolt 78. Each bolt 78 extends through an outer slide bracket 80, forming a part of a lasting unit 72, that is slidably mounted to a support 74 for inward-outward movement. Each lasting unit 72 includes an inner slide bracket 82 that is mounted to a support 74 for inward-outward movement. A knob 84 is pinned to the outer end 86 of each bolt 78, the outer ends 86 being of smaller diameter than the threaded portions of the bolts 78. The brackets 80 are located between the shoulders located at the juncture of the larger and smaller diametered portions of the bolts 78 and shoulders formed at the inner ends of the knobs 84. Due to the connection between the outer brackets 80 and the inner brackets 82, described below, rotation of the knobs 84 in one direction or the other will cause inward or outward movement of the brackets 80, 82 along the supports 74 and thus cause inward or outward movement of the lasting units 72.

An air operated motor 88 is pivoted to each outer bracket 80 and extends inwardly thereof. The piston rod 90 of each motor 88 is pivoted by a pin 92 to the middle of a lever 94. Each lever 94 has an upper limb 96 and a lower limb 98, the limbs extending inwardly of the pin 92. Each limb 98 is pivoted by a pin 100 to a lever 102. The bottom of each lever 102 is pivoted by a pin 104 to a block 106 for inward-outward movement about the axis of the pin 104. Each block 106 is pivoted for heightwise movement to an inner slide bracket 82 by a pin 108. A shaft 110, mounted to and upstanding from each bracket 82 inwardly of its associated pin 108, extends through its associated block 106. Compression springs 112 are entwined about the shafts 110 and extend between the tops of the blocks 106 and collars 114 mounted to the tops of the shafts 110. The springs 112 yieldably urge the blocks 106 downwardly about the axes of the pins 108 to positions wherein the bottoms of the blocks 106 engage collars 116 that are mounted to the shafts 110 beneath the blocks 106.

A lasting instrumentality 118 is anchored to each block 106 by bolts 120. Each lasting instrumentality 118 is formed of three plies, the outer ply being an outer presser strap 122, the middle ply being an inner presser strap 124, and the inner ply being a lasting strap 126. The straps 122,124 and 126 are made of an elastic, flexible and deformable material such as urethane. The straps 122, 124 and 126 respectively have bottom segments 122a, 124a and 126a that are rigid by virtue of being secured to the block 106 by the bolts 120. The top of each lasting strap 126 is formed into a thickened relatively rigid top segment 126b. The middle segment 126c of the lasting strap 126, between the bottom segment 126a and the top segment 126b, is flexible, deformable and stretchable.

The top of each inner presser strap 124 is formed into a thickened relatively rigid top segment 124b that is located below its associated lasting strap top segment 126b. The middle segment 124c of the inner presser strap 124, between the bottom segment 124a and the top segment 124b, is flexible, deformable and stretchable.

The top of each outer presser strap 122 is formed into a thickened relatively rigid top segment 122b that is located below its associated inner pressure strap top segment 124b. The middle segment 122c of the outer presser strap 122, between the bottom segment 122a and the top segment 122b, is flexible, deformable and stretchable.

A lug 128, embedded in the outer presser strap top segment 122b, has a pin 130 mounted thereto that is slidably received in a slot 132 formed at the top of each lever 102.

A lug 134, embedded in the inner presser strap top segment 124b, is pivoted by a pin 136 to a link 138, and each link 138 is pivoted by a pin 140 to the top of its associated limb 96.

An air operated motor 142 is associated with each lasting instrumentality 118. Each motor 142 is pivoted to a bracket 144 that is secured to the top of each outer bracket 80. The motors 142 extend inwardly of the brackets 144. A socket 146 is embedded in each lasting strap top segment 126b. Each socket 146 rotatably receives a ball 148 that is mounted to the inner end of the piston rod 150 of its associated motor 142 to thereby provide a flexible connection between the piston rods 150 and the lasting strap top segments 126b.

As can be seen in FIG. 2, the lasting straps 126 in each of the sets of lasting units 56 are separated from each other from their bottoms up to points 152 that are approximately level with the bottoms of the top segments 124b of the inner presser straps 124 and are integral above the points 152 in the region 153.

Figure 8:
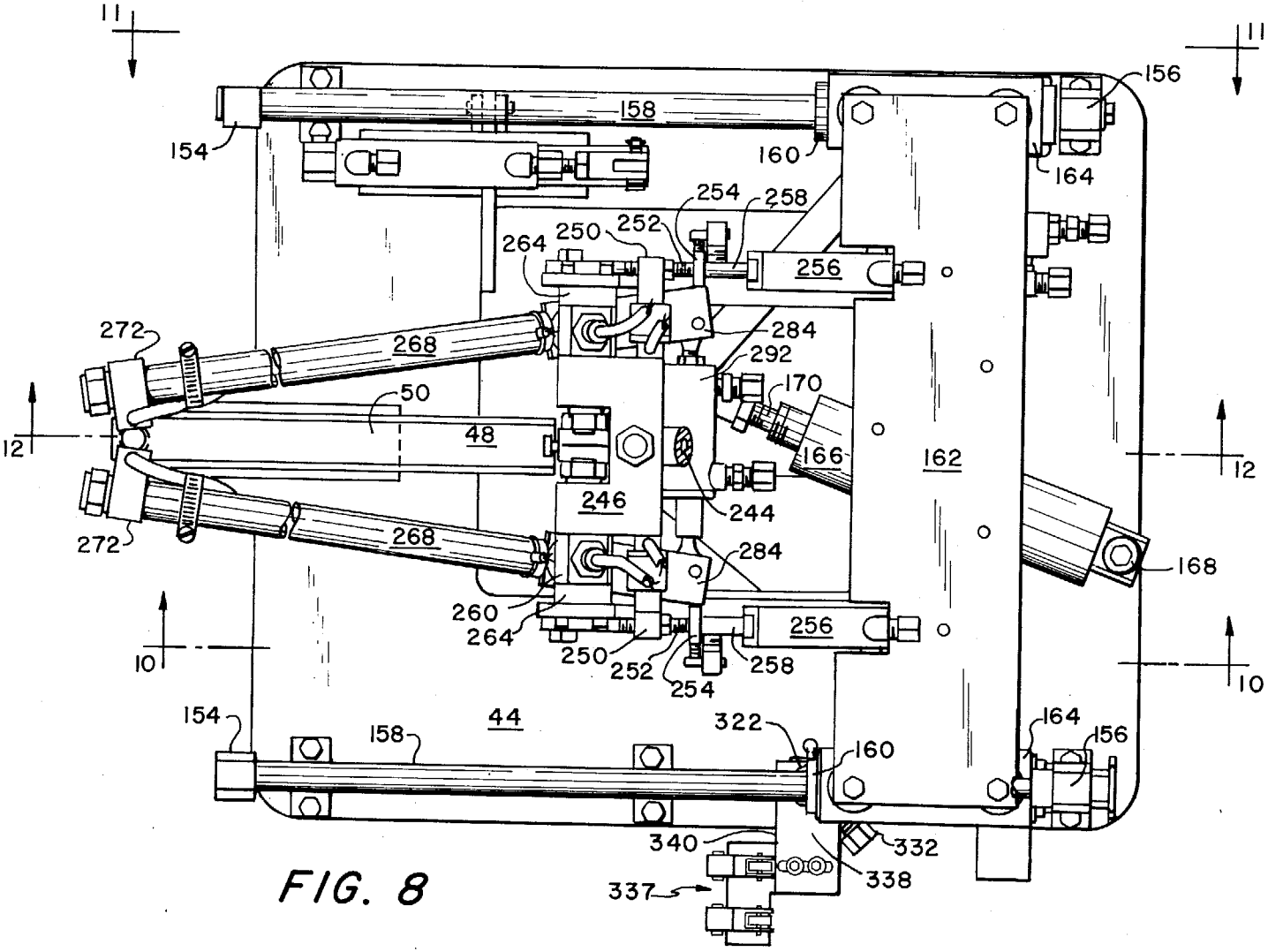
FIG. 8 is a plan view of the cement mechanism.

Referring to FIGS. 3 and 8, a pair of front posts 154 and a pair of back posts 156 are upstanding from the platform 44. The posts 154 and 156 are located on opposite sides of the platform 44 and a pair of slide rods 158 are secured to and extend between each set of posts 154 and 156 so as to be located on opposite sides of the platform 44 and so as to extend in forward-rearward directions. A bearing 160 is slidably mounted on each slide rod 158 for forward-rearward movement and a slide plate 162 extends between the bearings 160 and is secured to bearing blocks 164 that are mounted to each of the bearings 160.

An air operated motor 166 is pivoted to a post 168 that extends upwardly of the back of the platform 44. The motor 166 extends forwardly of the post 168 and has a forwardly extending piston rod 170 that is pivoted by a pin 172 (FIG. 9 to a link 174 between the ends of this link. One end of the link 174 is pivoted by a pin 176 to the front of a link 178, the back of the link 178 being pivoted to a post 180 that extends upwardly of the platform 44 forwardly of the post 168. The link 174 extends rearwardly of the pin 176 and laterally towards a side of the platform 44, and the end of the link 174 remote from the pin 176 is pivoted to a post 182 that extends upwardly of the link 174 and is secured to a bearing block 164.

Figure 9:
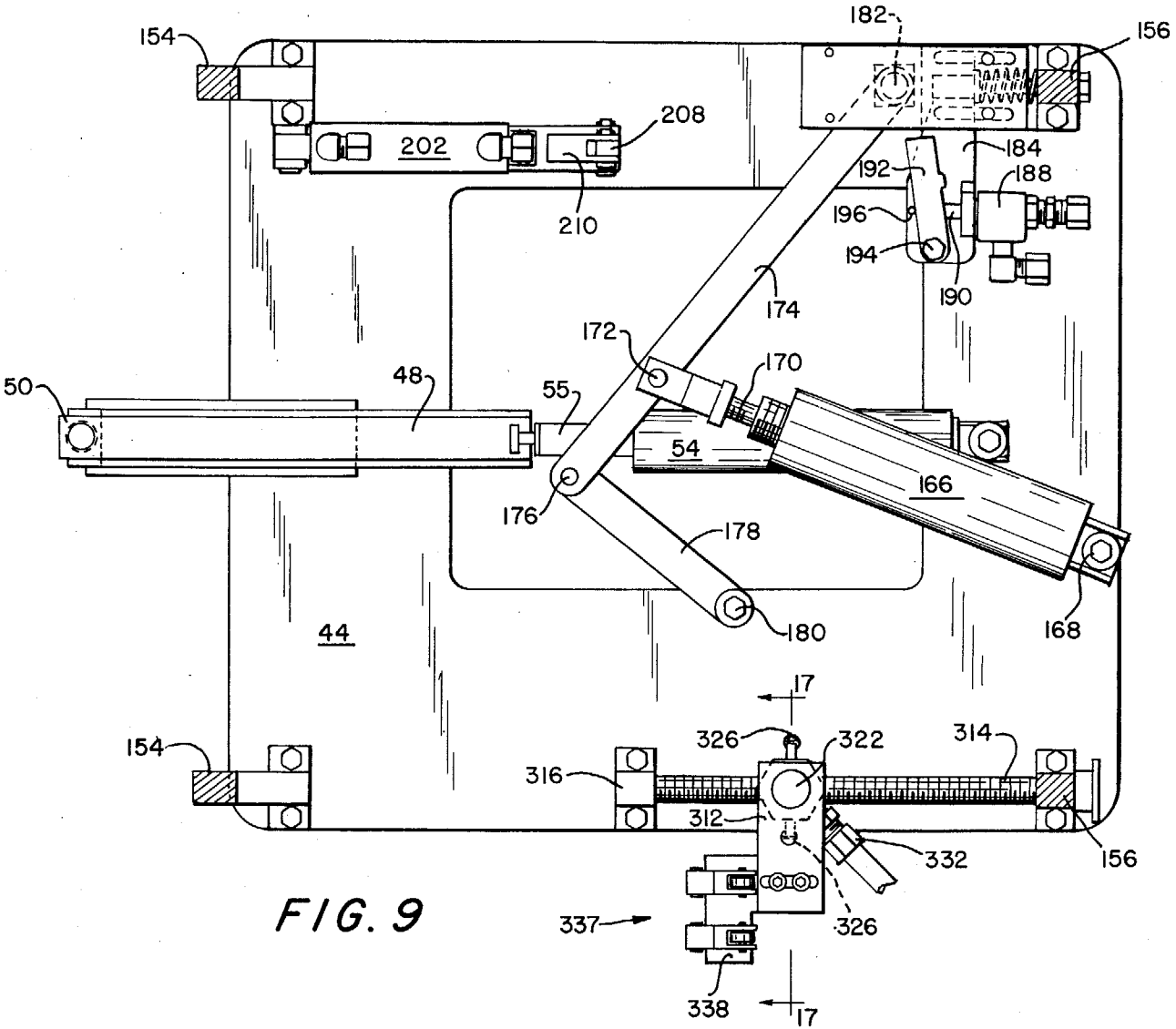
FIG. 9 is a plan view of a drive mechanism of the cement applying mechanism for effecting movement in forward-rearward directions of the cement nozzles.
Figure 11:
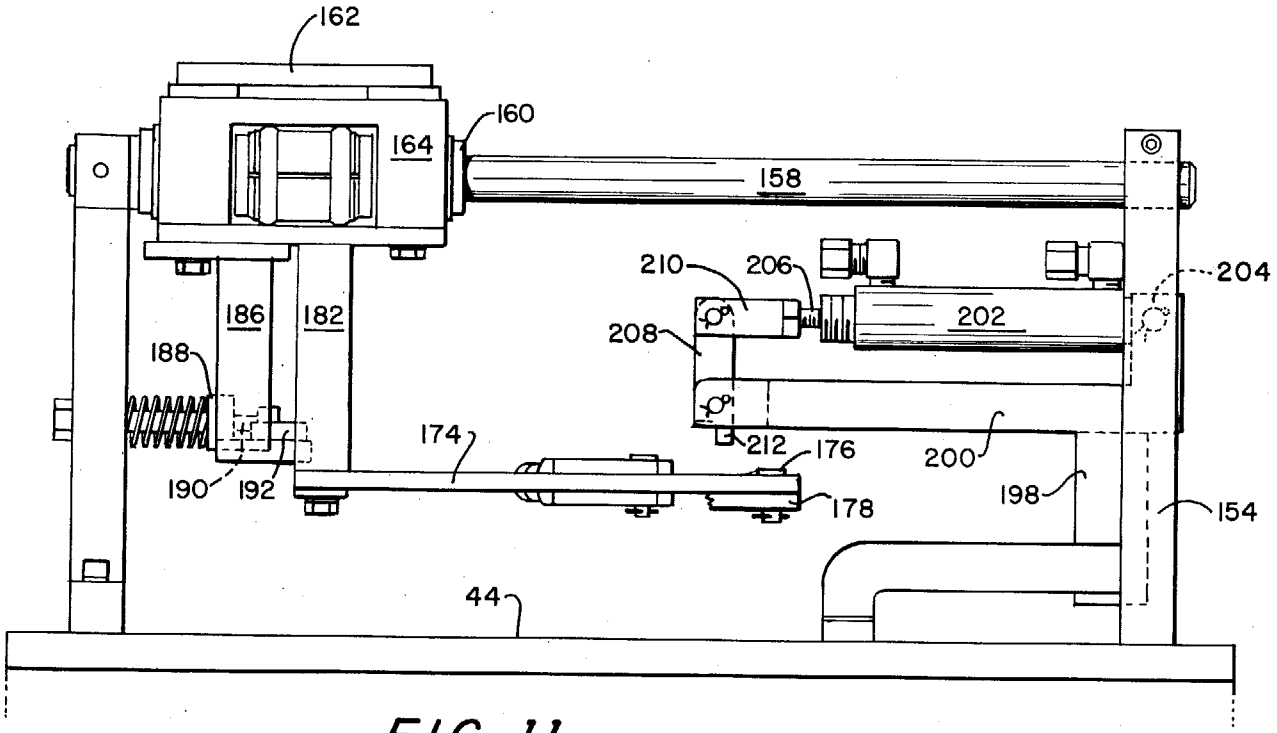
FIG. 11 is a view taken along the line 11 — 11 of FIG. 8.

Referring to FIGS. 9 and 11, a projection 184 extends inwardly of the bottom of a post 186 that depends from a bearing block 164. A valve 188, mounted to the projection 184, has a forwardly directed valve stem 190 that is spring urged forwardly by the conventional spring in the valve 188 so as to urge the valve stem 190 against a valve actuating rod 192 that is pivoted to the projection 184 for forward-rearward swinging movement about the axis of a pin 194. The valve stem 190 urges the rod 192 forwardly about the axis of the pin 194 to a position wherein the front of the rod 192 engages a stop pin 196 that is upstanding from the projection 184.

Referring to FIG. 11, a column 198 is mounted in the machine adjacent the front posts 154 for forward-rearward adjustment by means that are not shown. A support 200 extends rearwardly of this column. An air actuated motor 202 is pivoted to a clevis 204 mounted to the support 200 and the piston rod 206 of the motor 202 extends rearwardly of this motor. The top of a bar 208 is pivoted to a clevis 210 that is secured to the back of the piston rod 206. The bottom of the bar 208 is so pivoted to the back of the support 200 that a stop lug 212 extends below the support 200 in alignment with the outer end of the rod 192 that is remote from the pin 194.

Figure 12:
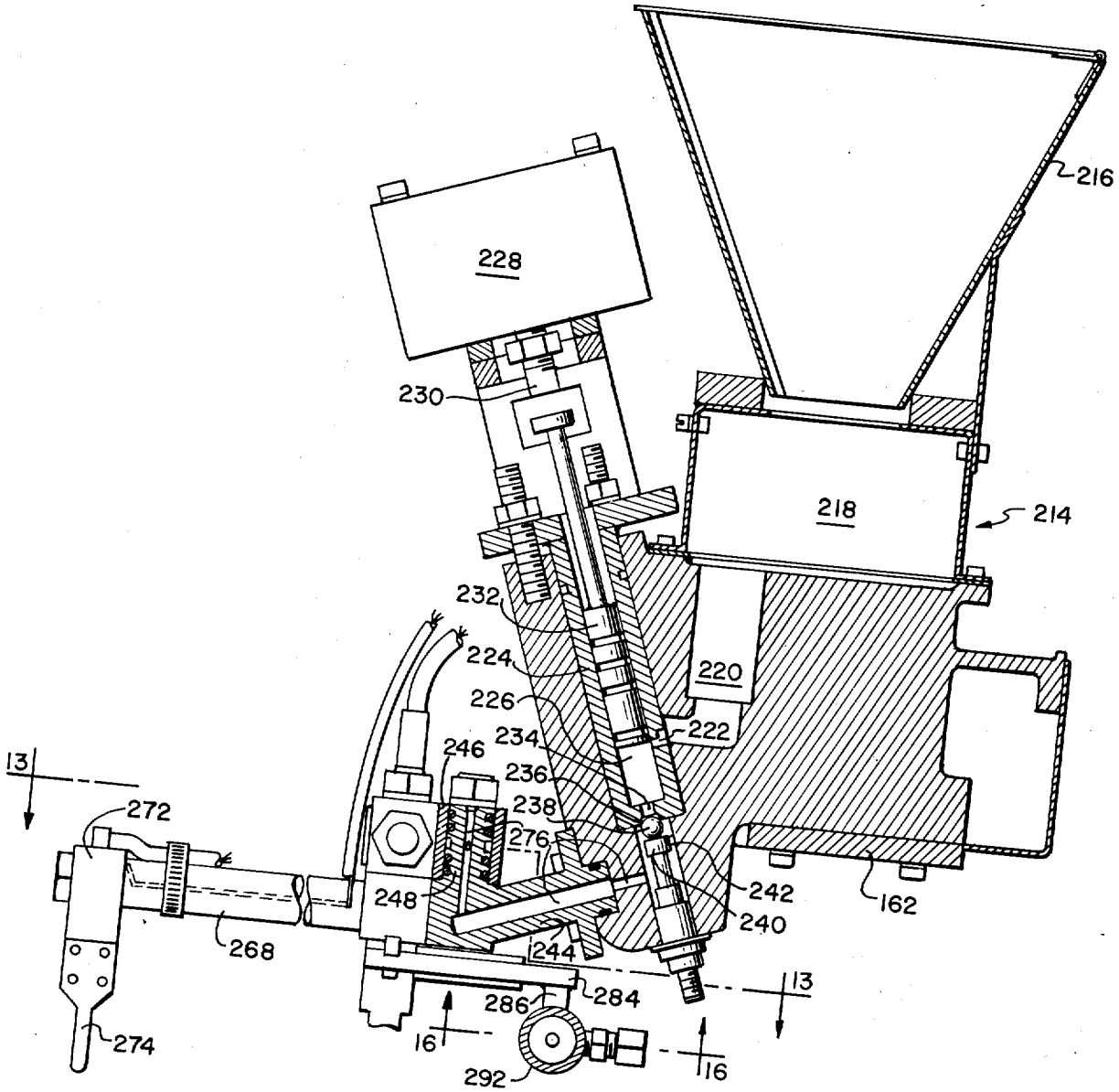
FIG. 12 is a side elevation, partially in section, taken along the line 12 — 12 of FIG. 8.

Referring to FIG. 12, a cement pot 214 is mounted to the slide plate 162 for forward-rearward movement therewith. The cement pot includes a funnel 216 into which solid granules of thermoplastic cement is supplied and a storage chamber 218 into which the solid cement gravitates from the funnel 216 and in which the cement is melted by heating means (not shown). The molten cement gravitates from the chamber 218 through the passage 220 and an orifice 222 in a hollow sleeve 224 into a bore 226 forming the hollow interior of the sleeve 224. The sleeve 224 is mounted to the cement pot 214. An air operated motor 228, also mounted to the cement pot 214, has a downwardly depending piston rod 230 to which is attached a downwardly depending plunger 232 that is slidable in the bore 226. An orifice 234 in the bottom of the sleeve 224 has a valve seat 236 formed thereon that is cooperative with a ball valve 238 to close the orifice 234 in response to upward movement of the plunger 232 in the manner described below. The ball valve normally rests on a support member 240 that is mounted to the cement pot 214 so that communication is provided between the orifice 234 and a passage 242 located below the orifice 234.

Figure 10:
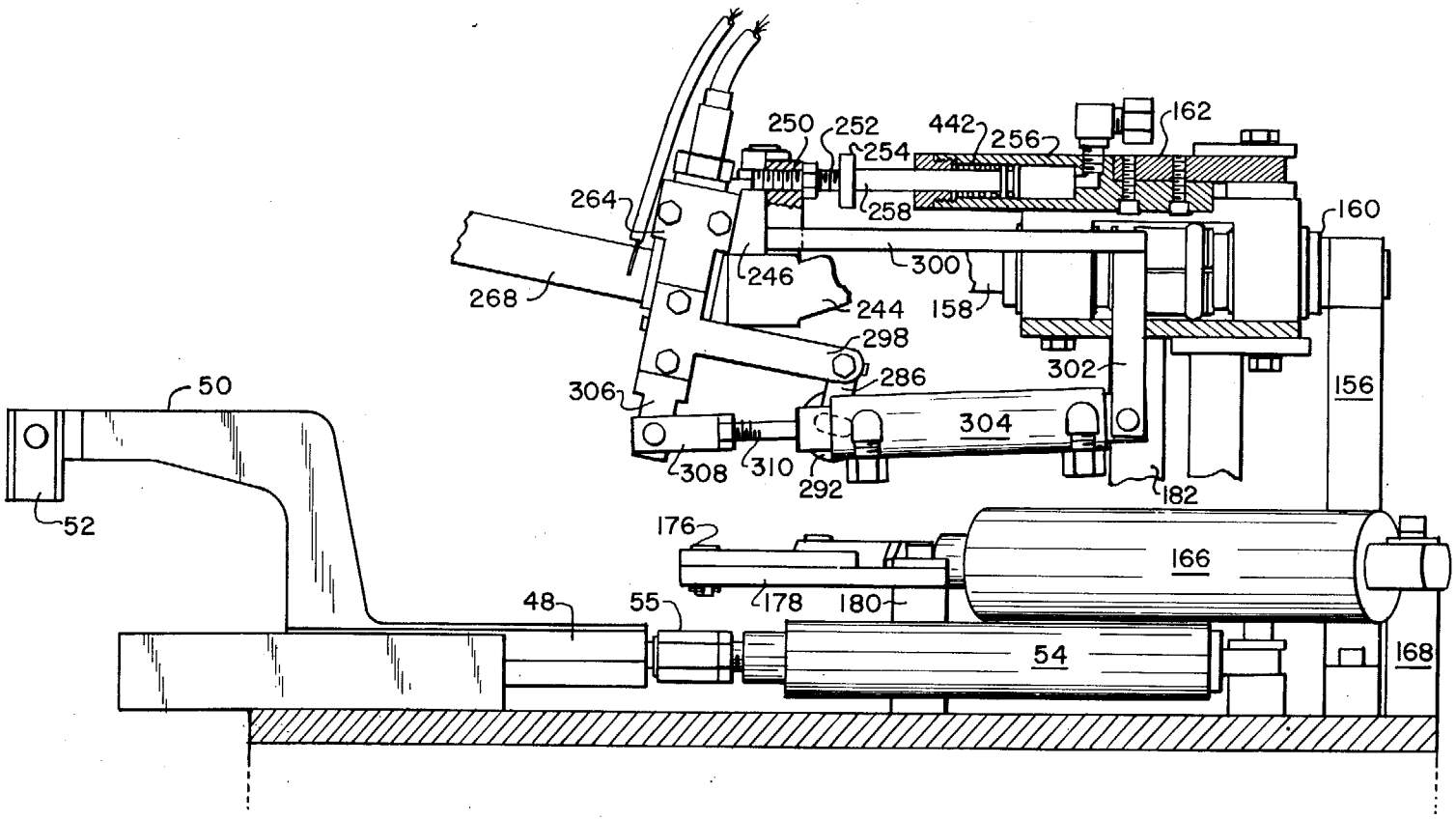
FIG. 10 is a view taken along the line 10 — 10 of FIG. 8.
Figure 13:
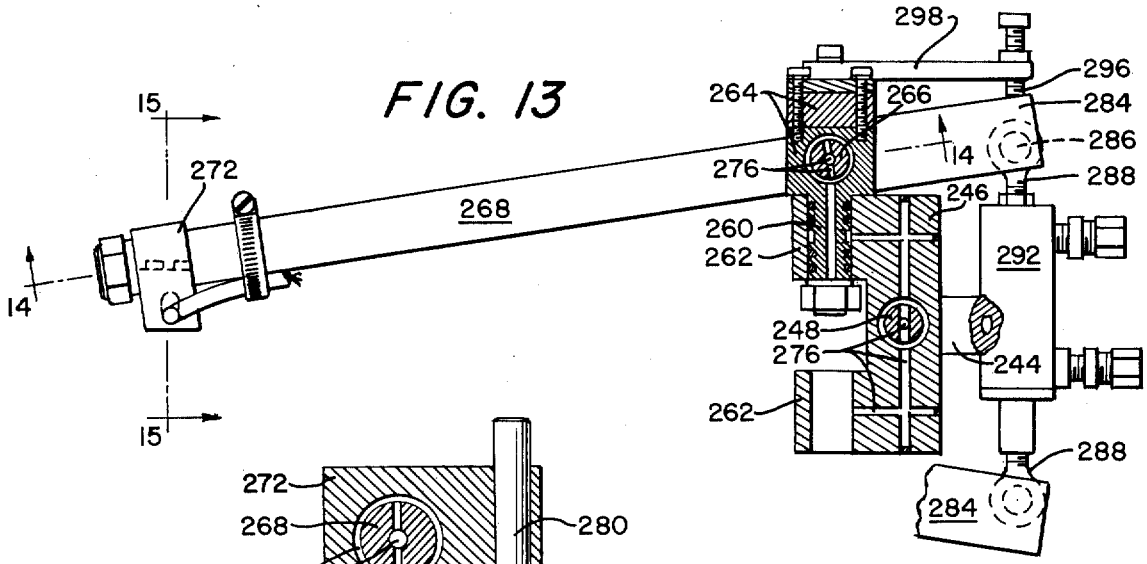
FIG. 13 is a partially sectional view taken along the line 13 — 13 of FIG. 12.

Referring to FIGS. 12 and 13, a prong 244 is secured to and extends downwardly and forwardly of the cement pot 214. A block 246 is pivoted to a post 248 extending upwardly of the front of the prong 244 for swinging movement about the upright axis of the post 248. A projection 250 (FIG. 8) extends laterally of each side of the block 246 and a stabilizer bolt 252 is secured to each projection 250 with a head 254 of each bolt 252 extending rearwardly of its associated projection 250. As shown particularly in FIGS. 8 and 10, a pair of single acting spring return air operated motors 256 are so mounted to the slide plate 162 that their forwardly directed piston rods 258 are in alignment with the bolt heads 254.

Figure 15:
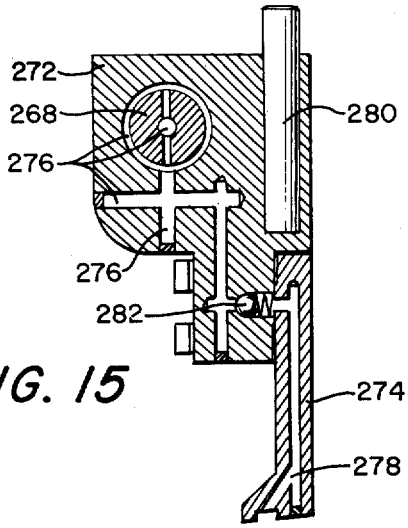
FIG. 15 is a section taken along the line 15 — 15 of FIG. 13.
Figure 14:
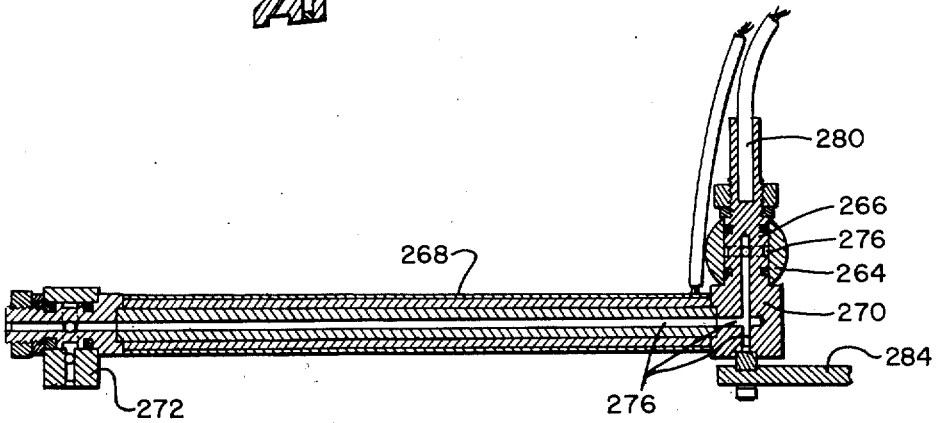
FIG. 14 is a section taken along the line 14 — 14 of FIG. 13.

A pair of aligned spindles 260 (FIG. 13) are mounted for swinging movement about a horizontal axis in projections 262 of the block 246, the spindles having extensions 264 that extend outwardly of the block 246. A heightwise extending spindle 266 (see FIGS. 13 and 14) is rotatably mounted in each spindle extension 264 and a nozzle carrier 268 is mounted to an extension 270 of the spindle 266 so as to extend forwardly thereof. A nozzle holder 272 is mounted to the front of each nozzle carrier 268 and a nozzle 274 (FIG. 15) is mounted to and depends downwardly of each nozzle holder 272. Interconnected passage means 276 in the cement pot 214, the prong 244, the block 246, the post 248, the spindles 260, the spindle extensions 264, the spindles 266, the nozzle carriers 268, the nozzle holders 272 and the nozzles 274 provide communication for the molten cement between the passage 242 and passages 278 (FIG. 15) located in each of the nozzles 274. Strategically located electric cartridge heaters, such as the heaters 280 shown in FIGS. 14 and 15, serve to maintain the cement that is in the passage means 276 and the passages 278 molten. A check valve 282 (FIG. 15) in each nozzle holder 272 yieldably blocks the flow of cement through the passage means 276.

Figure 16:
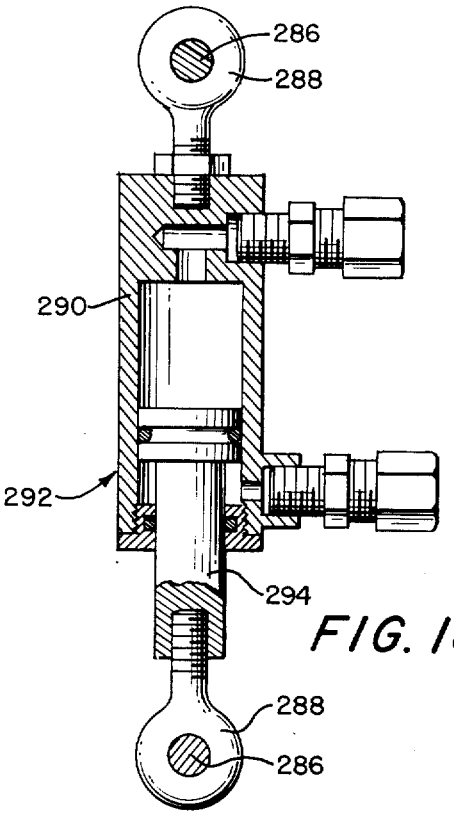
FIG. 16 is a section taken along the line 16 — 16 of FIG. 12.
Figure 17:
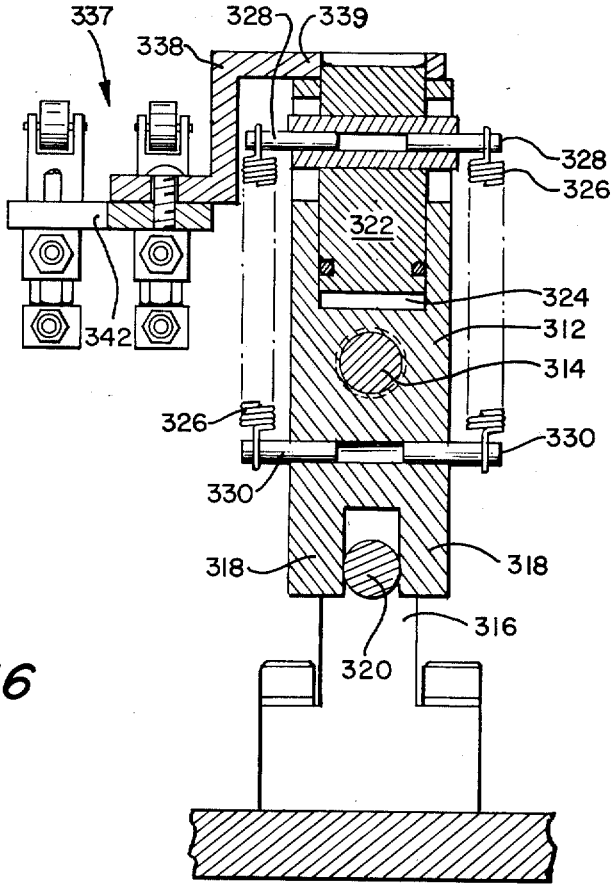
FIG. 17 is a view taken along the line 17 — 17 of FIG. 9.

Each spindle extension 270 has a bar 284 (FIGS. 12 – 14) extending rearwardly thereof that has a bar 286 depending from its back end. Each bar 286 is mounted to a yoke 288. One of the yokes 288 is secured to the cylinder 290 (FIG. 16) of an air operated motor 292 and the other yoke 288 is secured to the piston rod 294 of this motor. As described below, the operation of the motor 292 serves to swing the nozzle carriers 268 and the bars 284 about the axes of the spindles 266. The extent of outward movement of the bars 284 and the extent of inward movement of the nozzle carriers 268 is determined by the engagement of the bars 284 with stop bolts 296 that are located outwardly of the bars 284 and are mounted to bars 298 that in turn are secured to their associated block extensions 264.

A rod 300 (FIG. 10) attached to and extending rearwardly of each projection 250 of the block 246 has a post 302 depending from its back, and an air operated motor 304 is pivoted to the bottom of each post 302.

A lug 306, depending downwardly of and connected to each spindle extension 264, is pivoted to a clevis 308 that is secured to the piston rod 310 of its associated motor 304, the piston rods 310 projecting forwardly of the motors 304.

Referring to FIGS. 3, 8, 9 and 17, a block 312 is threaded onto a shaft 314. The shaft 314 is rotatably mounted and extends between one of the back posts 156 and a pillar 316 that is mounted to the platform 44.

Depending lugs 318, on the block 312, straddle a rod 320 that is secured to the pillar 316, and the back post 156 associated with the shaft 314 and is located below the shaft 314. Rotation of the shaft 314, by means not shown, serves to adjust the forward-rearward position of the block 312. An air operated cylinder 322 is mounted for heightwise movement in a cavity 324 in the block 312 and is resiliently urged downwardly of the block by tension springs 326 that extend between pins 328 anchored to the cylinder 322 and pins 330 anchored to the block 312. The bottom of the cavity 324 is in communication with a coupling 332 that is connected, via lines described below, to a source of pressurized air. A valve assembly 337 is mounted to a flange 338 that is secured to the top of the cylinder 322. The valve assembly 337 is offset outwardly of the cylinder 322. The flange 338 includes a forwardly facing upper portion 339 having a forwardly facing stop surface 340 (FIG. 8) that is approximately at the level of the top of the cylinder 322 and a lower surface 342 to which the valve assembly is mounted. A cam 352 is mounted to the bearing block 164 associated with the back post 156 in which the shaft 314 and the rod 320 are mounted. The cam 352, as described below, is in alignment with the stop surface 340 and the valve assembly 337 when the cylinder 322 has been raised to an upper position.

Figure 18:
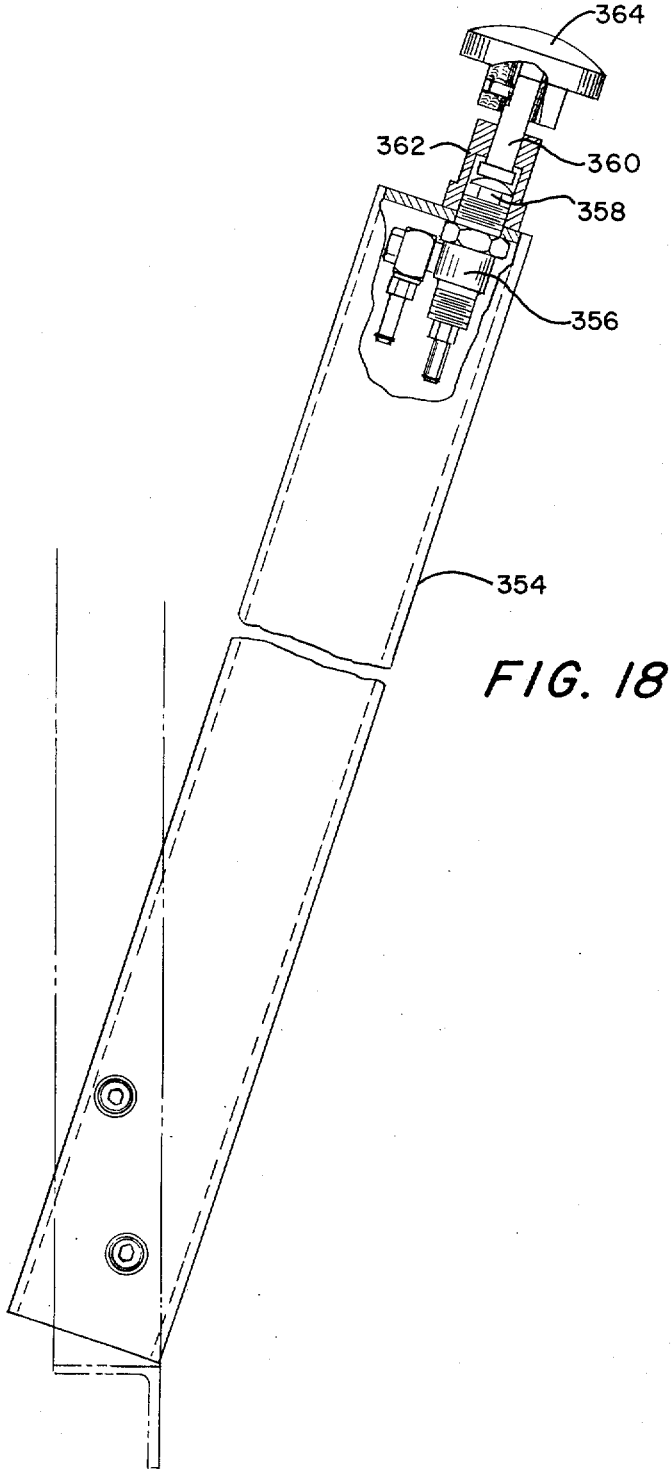
FIG. 18 is a partially sectional view taken along the line 18 — 18 of FIG. 1.

As shown in FIGS. 1 and 2, hollow posts 354 are mounted to the front of the machine so as to extend upwardly on opposite sides of the shoe support 43. Referring to FIG. 18, a valve 356 is mounted in the top of each post 354. The valve stem 358 of each valve 356 is resiliently urged upwardly by the conventional spring mechanism incorporated in its associated valve 356. The top of each stem 358 bears against the bottom of a plunger 360 that is slidably guided for heightwise movement in a sleeve 362 that is secured to the top of each post 354. A knob 364 is mounted to the top of each plunger 360.

In the idle condition of the machine: the piston rod 18 is retracted into the motor 16 to thereby maintain the shoe support 43 in a lower position; there is no pressurized air entering either of the motors 40 so that the piston rods 42 are not projected inwardly of the motors 40 and the toe rest 32 is free to swing leftward or rightwardly, as seen in FIG. 1, about the axis of the pin 28 until the appropriate side of the cam 36 engages the corresponding wing 34; the piston rod 55 is retracted into the motor 54 to maintain the hold-down 52 in a rearward position; the piston rods 62 are retracted into the motors 60 to thus force the bases 64 into outer positions and thus position the sets of lasting units 56 in outer positions wherein they do not interfere with the placement of a shoe assembly on the shoe support 43 as described below; the piston rods 90 are retracted into the motors 88 and the piston rods 150 are retracted into the motors 142 thus placing the lasting instrumentalities 118 in outer positions on the supports 74; the piston rod 170 is retracted into the motor 166 to thereby locate the slide plate 162 and the parts carried thereby, including the cement nozzles 274, in a rearward position with the cam 352 located rearwardly of the valve assembly 337 and the flange 338; the piston rod 206 is retracted into the motor 202 so that the stop lug 212 is in alignment with the rod 192; the piston rod 230 is retracted into the motor 228 so that the bottom of the plunger 232 is above the orifice 222; the piston rods 258 are projecting out of the motors 256 under relatively low pressure and bear against the bolt heads 254 so that the block 246, together with the nozzles 274, is restrained against movement about the upright axis of the post 248; the cylinder 290 and the piston rod 294 of the motor 292 are extended away from each other so that the nozzles 274 are swung above the axes of the spindles 266 to positions that are relatively close to each other in positions determined by the engagement of the bars 284 with the stop bolts 296; the piston rods 310 are projected out of the motors 304 to thereby move the nozzles 274 about the axis of the spindles 260 to raised positions; the cylinder 322 is retained in a lowered position in the block 312 by the springs 326 to thereby lower the stop surface 340 and the valve assembly 337 out of intersecting relation with respect to the cam 352; and the valves 356 are closed with the valve stems 358 pushing the plungers 360 to the raised FIG. 18 position.

Thermoplastic cement is placed in the funnel 216 of the cement pot 214 and gravitates into the chamber 218 wherein it is melted. The molten cement flows from the chamber 218 through the passage 220, the orifice 222, the passage 242, and the passage means 276 up to the valves 282 in the nozzle holders 272.

Figure 20A:
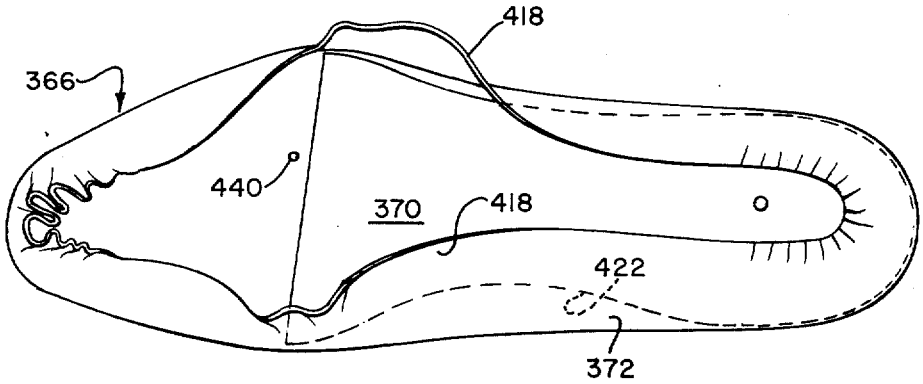
FIG. 20A is a view taken along the line 20A — 20A of FIG. 20.
Figure 20:
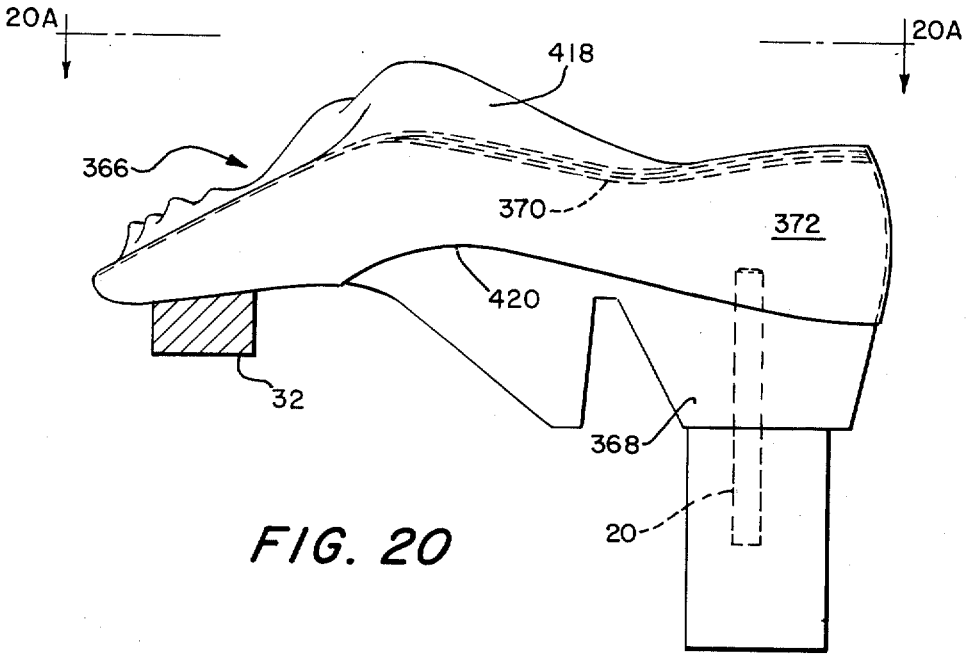
FIG. 20 is a representation of the shoe assembly as it is supported in the machine at the beginning of a machine cycle.

A shoe assembly 366 (FIGS. 20 and 20A) comprising a last 368 having an insole 370 located on its bottom and an upper 372 mounted thereon is placed bottom-up on the shoe support 43 with the vamp of the shoe assembly resting on the toe rest 32 between upstanding toe rest flanges 371, (FIG. 1) and with the last pin 20 inserted into the thimble in the back portion of the last so that the toe of the shoe assembly faces forwardly. Prior to placement in the machine, the shoe assembly 366 had been toe lasted and heel lasted. In FIGS. 20 and 20A the shoe assembly 366 is illustrated as being for a left foot and the machine operating cycle described will be for a left foot shoe assembly.

Figures 19, 19A:
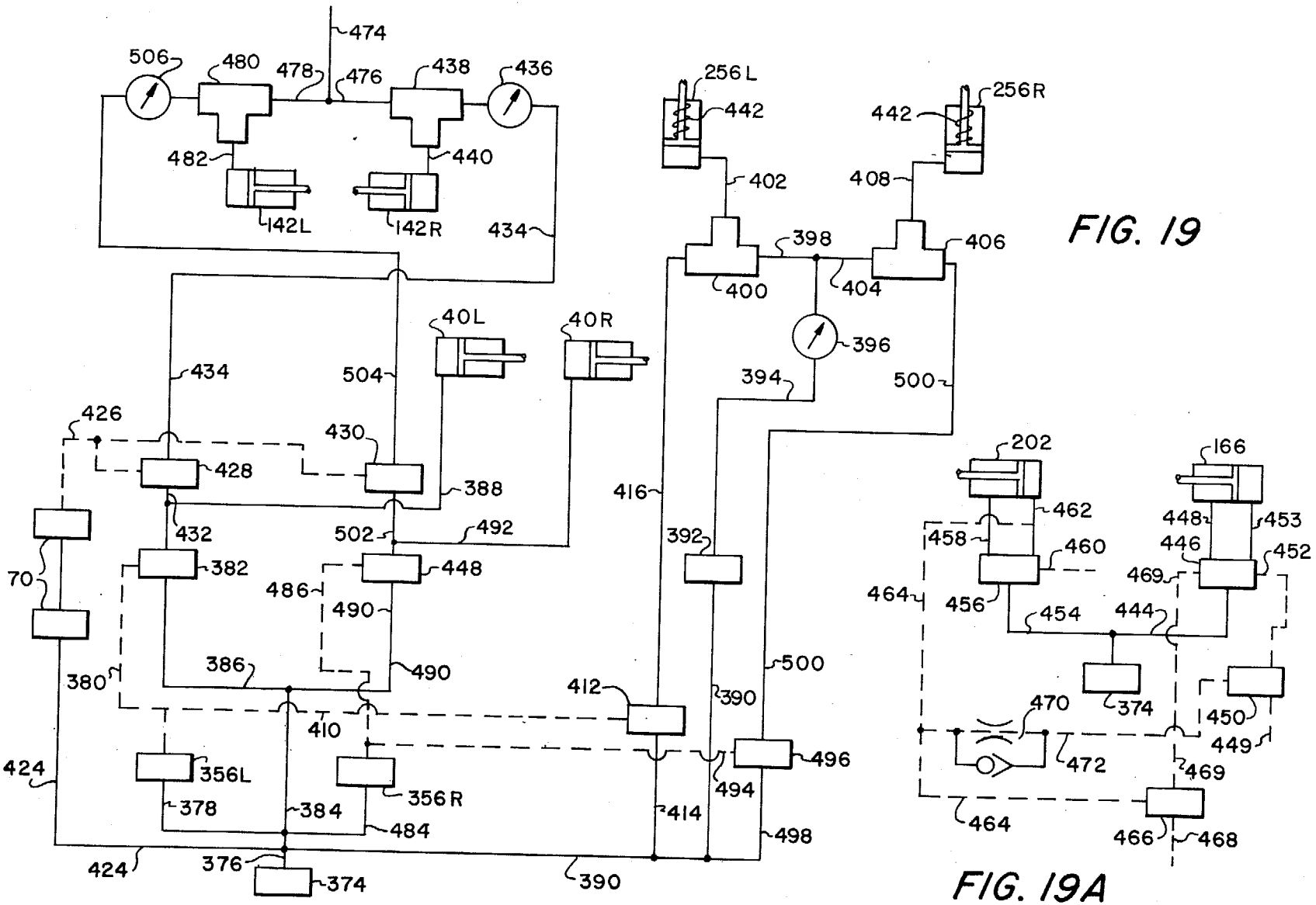
FIGS. 19 and 19A are schematic representations of portions of the pneumatic control of the machine.

Referring to the circuit diagram of FIG. 19, the valve 356 mounted in the left post 354, as seen in FIG. 1, is designated 356L and the valve 356 in the right post 354, as seen in FIG. 1, is designated 356R. Similarly, the motor 40 on the left of the shoe support 43, as seen in FIG. 1, is designated 40L in FIG. 19, and the motor 40 on the right of the shoe support 43, as seen in FIG. 1, is designated 40R in FIG. 19. In addition, in FIG. 19 the motor 256 that is to the left of the shoe support 43 as one looks from the front of the machine (the upper motor 256 in FIG. 8) is designated 256L and the motor 256 that is to the right of the shoe support as one looks from the front of the machine (the lower motor 256 in FIG. 8) is designated 256R.

To start the machine cycle, the left knob 364 (FIG. 1) is momentarily depressed by the operator to momentarily open valve 356L. As shown in FIG. 19, this enables pressurized air to flow from a manifold 374 through lines 376 and 378, the valve 356L and a pilot line 380 to the left of the valve 382 to shift the valve to open position. The opening of the valve 382 enables pressurized air to flow from the line 376 through lines 384 and 386, the valve 382 and a line 388 to the motor 40L to thereby actuate the motor 40L. The actuation of the motor 40L causes its piston rod 42 to be projected rightwardly (FIG. 1) to thereby engage the mount 26 and swing the mount 26, together with the toe rest 32, rightwardly about the axis of the pin 28 until the cam 36 engages the right wing 34. The rightward swinging of the toe rest causes the toe end of the shoe assembly 366 to swing rightwardly about the upright axis of the pin 28.

In the idle condition of the machine pressurized air flows from the line 376 through a line 390, a valve 392, a line 394, and a pressure regulator 396 set at a relatively low pressure. From the pressure regulator 396, pressurized air flows through a line 398, a shuttle valve 400, and a line 402 to the blind end of the motor 256L and pressurized air flows through a line 404, a shuttle valve 406 and a line 408 to the blind end of the motor 256R. The pressurized air respectively flowing into the motor 256L and 256R through the lines 402 and 408 at the relatively low pressure set by the pressure regulator 396 maintains these motors in their idle condition.

The aforementioned momentary opening, by the operator, of the valve 356L enables pressurized air to flow from the line 380 through a pilot line 410 to the left side of a valve 412 to shift this valve to open position. The opening of the valve 412 enables air at a higher pressure than that set by the regulator 396 to flow from the line 390 through a line 414, the valve 412, a line 416, the shuttle valve 400 and the line 402 to the blind end of the motor 256L to thus project the piston rod 258 of the motor 256L forwardly under a pressure that is higher than the pressure projecting the piston rod 258 of the motor 256R forwardly. As a result, the block 246 is swung counter-clockwise (FIG. 8) about the axis of the post 248 so as to swing the nozzles 274 rightwardly as seen from the front of the machine (downwardly in FIG. 8).

By means not shown, the opening of the valve 382 also actuates the motor 54 to project its piston rod 55 forwardly to thereby move the hold-down 52 forwardly over the bottom of the shoe assembly. This is followed by an actuation of the motor 16 to project its piston rod 18 upwardly to thereby raise the shoe support 43, together with the shoe assembly, until the heel portion of the insole 370 bears against the hold-down 52 to thus clamp the shoe assembly in position in the machine.

The motors 60 are now actuated to project their piston rods 62 inwardly to thus move the bases 64, together with the sets of lasting units 56, inwardly to positions wherein the bolts 66 engage the flanges 68 and open the normally closed valves 70. As a result, the lasting instrumentalities 118 are positioned close to but not in engagement with the shoe assembly.

Figure 21:
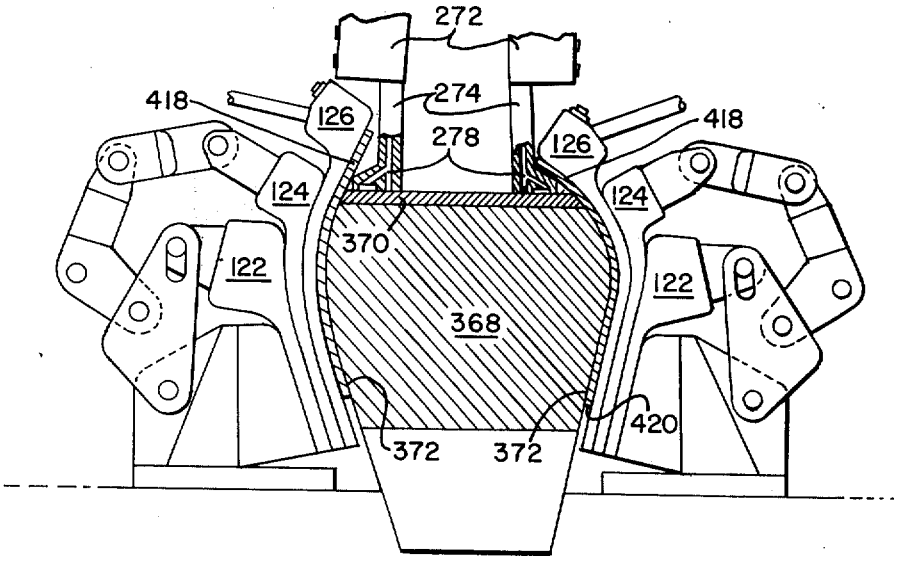
FIG. 21 is a view showing the nozzles as they appear when applying cement into the corners between the side portions of the upper margin and the corresponding portions of the insole periphery.

The opening of the valves 70, by means not shown, operates the motors 88 so as to vent pressurized air from the rod ends of these motors and admit pressurized air under relatively high pressure to the blind ends of these motors. The admission of pressurized air to the blind ends of the motors 88 enables each piston rod 90 to cause a lasting instrumentality 118 to move inwardly with respect to its support 74 with its inner bracket 82 sliding on the support until the lasting strap bottom segment 126a engages and meets resistance from the shoe assembly 366. At this time, since there is no pressurized air in the motors 142, the piston rods 150 are dragged inwardly of the motors 142 during the inward movements of the lasting instrumentalities 118. The lasting strap bottom segments 126a engage the side portions of the shoe assembly 366, between its previously lasted toe and heel portions, wherein the margin 418 of the upper 372 extends away from the insole as shown in FIG. 21. The rigid bottom segment 126a straddles the top line 420 of the upper so as to clamp the top line against the last 368. Upon engagement of a bottom segment 126a with the shoe assembly 366, the continued force applied by the piston rod 90, through the lever limb 98, causes the lever 102 to swing inwardly about its pivot pin 104. The inward swinging of the lever 102, through the pin and the slot connection 130 and 132, causes the outer pressure strap top segment 122b to be forced inwardly thus flexing inwardly the outer presser strap middle segment 122c. This is followed by an inward swinging of the lever 94 about its pivot pin 100 which, through the lever limb 96 and the link 138, causes the inner presser strap top segment 124b to be forced inwardly thus flexing inwardly the inner presser strap middle segment 124c.

It is desired, during the lasting of the shoe, that the top line 420 of the upper 372 be clamped against the last 368 and remain stationary on the last while the portions of the upper extending from the top line towards the last bottom and the insole 370 have any slack and wrinkles taken out and then be pressed tightly against the last. This is accomplished by virtue of the fact that the bottom segment 126a first rigidly clamps the top line 420 to the last after which the outer presser strap top segment 122b is moved against the shoe assembly followed by a movement of the inner presser strap top segment 124b against the shoe assemby. The movements of the presser straps against the shoe assembly causes the lasting strap middle segment 126c to flex and press the upper between the top line and the insole bottom against the last while conforming to the shape of the last. Since the outer presser top segment 122b is lower than the inner presser strap top segment 124b, the pressure applied by the lasting strap middle segment 126c against the upper commences at its bottom proximate to its rigid bottom segment 126a and works its way upwardly. Therefore, the upper is progressively urged upwardly of the top line as it is pressed against the last thus pressing the upper against the last in a wrinkle free manner. At the completion of the pressing of the upper against the last by the lasting strap middle segment 126c, the lasting strap top segment 126b extends upwardly of the insole 370 and outwardly of the upper margin 418 as indicated in FIG. 21.

From the foregoing it can be seen that at the time the motors 88 are actuated to move their piston rods 90 inwardly, the lasting instrumentalities must be on opposite sides of the shoe assembly 366 in positions that are close to but not in engagement with the shoe assembly and that these positions are determined by the engagement of the bolts 66 with the flanges 68. When operating on a left foot shoe assembly, with the toe rest 32 on the longitudinal center line of the machine, the left side of the shoe assembly (the upper side in FIG. 20A) projects further from the longitudinal center line of the machine than the right side of the shoe assembly (the lower side in FIG. 20A). Therefore, with a left foot shoe assembly and with the toe rest 32 located on the longitudinal center line of the machine, when the motors 60 have completed the inward movement of the lasting instrumentalities 118 due to the engagement of the bolts 66 with the flange 68, the flange 68, the lasting instrumentalities 118 on the left side (FIG. 1) of the machine will be closer to its associated side of the shoe assembly 366 than the lasting instrumentalities on the right side of the shoe assembly. In some instances, the lasting instrumentalities on the left side of the machine may actually be in engagement with the shoe assembly. It is for the purpose of avoiding the undesirable condition that the toe end of the shoe assembly 366 was caused to swing rightwardly about the axis of the last pin 20 by the motor 40L.

As shown in FIG. 20A, the right side of the last 368 of the left foot shoe assembly 366 (the bottom side as seen in FIG. 20A) has a reentrant portion 422 that curves inwardly of and between the toe and heel portions of the side of the last. The other side of the last has a much less pronounced reentrant portion.

In FIG. 19, the motors 142 that are on the right side of the machine as seen in FIG. 1 are designated 142R and the motors 142 that are on the left side of the machine as seen in FIG. 1 are designated 142L.

The opening of the valves 70 in response to the inward movement of the bases 64, in addition to operating the motors 88, allowed pressurized air to pass from the line 376 through a line 424, the valves 70 and a pilot line 426 to the left sides of valves 428 and 430 to thereby shift the valves 428 and 430 to open position. The opening of the valve 428 enables pressurized air to flow from the valve 382 through a line 432, the valve 428, a line 434, a pressure regulator 436 set at a relatively low pressure, a shuttle valve 438 and a line 440 to the blind ends of the motors 142R to thereby force the piston rods 150 of the motors 142R inwardly at a lower pressure than the pressure that had been applied to the motors 88. The pressurized air is admitted to the blind ends of the motors 142R at the same time as it is admitted to the blind ends of the motors 88. However, due to the pressure of the air entering the motors 142R being lower than the pressure of the air entering the motors 88, the actuation of the motors 142R to force their piston rods 150 inwardly is delayed until the outer presser straps 122 have been flexed inwardly to cause the upper 372 to conform snugly to the shape of the last 368 and to press the upper against the last.

The actuation of the motors 142R forces the associated lasting strap top segments 126b on the right side of the machine as seen in FIG. 1 and 21 inwardly under the relatively low pressure of the pressure regulator 436 to provide an inwardly directed back-up force that folds each lasting strap top segment 126b downwardly about its juncture with its lasting strap middle segment 126c so that the top segment 126b forms an acute angle with respect to the insole 370, this being permitted by the flexible connection provided by the ball and socket connections 146, 148. This causes the upper margin 418 on the side of the shoe assembly having the reentrant portion 422 to be folded downwardly about the periphery of the insole, part way towards the insole, as indicated in FIG. 21, to form an acute angle with the insole.

Now pressurized air is caused to enter the blind end of the motor 166 to thereby project its piston rod 170 forwardly and thus cause the slide plate 162 and the parts carried thereby, including the nozzles 274, to move forwardly until the valve actuating rod 192 engages the stop lug 212. The stop lug 212 is so located that it is engaged by the rod 192 at a location such that the nozzles 274 are over the widest part of the shoe assembly, indicated by number 440 in FIG. 20A.

The engagement of the rod 192 by the lug 212 causes the valve 188 to open. The opening of the valve 188 causes pressurized air to pass to the rod ends of the motors 304 to thereby retract the piston rods 310 into the motors 304 and thus cause the nozzles 274 to be lowered under the yieldable force of the pressurized air in the motors 304 until they engage the insole 370 in the general region indicated by number 440 in FIG. 20A wherein the nozzles are spaced from the uppe margins 418 and the insole periphery laterally of th side portions of the upper margin and the correspond ing portions of the insole periphery that are betwee the previously wiped toe end and heel end portions o the upper margin.

As described above, the toe portion of the shoe as sembly 366 was swung rightwardly about the axis of th last pin 20 by the motor 40L. In order to insure that th nozzles engage the insole 370 inwardly of the uppe margin 418, the nozzles were also swung rightwardly as described above, by the admission of the relatively high pressure air to the motor 256L.

After the nozzles 274 have been lowered against the insole 370 by the motors 304, the motor 292 is so actuated by pressurized air as to move the yokes 288 inwardly under the yieldable force of the pressurized air and thus move the nozzles 274 outwardly along the insole 370 into the angle between the insole and the upper margin 418 until the nozzles engage the upper margin as indicated in FIG. 21. At the same time, the low pressure air entering the motors 256L and 256R through the low pressure air regulator 396 is shut off and the valve 412 is shifted to cut off the relatively high pressure air entering the motor 256L by way of the line 416. As a result, the return springs 442 (FIGS. 10 and 19) of the motors 256L and 256R retract the piston rods 258 of these motors rearwardly out of engagement with the bolt heads 254 to thereby enable the motor 292 to move the nozzles 274 outwardly.

Referring to FIG. 19A, the motor 166 is maintained in its idle condition by pressurized air passing from the manifold 374 through a line 444, a valve 446 and a line 448 to the rod end of the motor 166. The motor 166 was actuated to move the slide plate 162 forwardly as a result of the shifting of a valve (not shown) which enabled pressurized air to pass through a pilot line 449, a valve 450 and a pilot line 452 to the right side of the valve 446 to thereby shift the valve 446 and enable pressurized air to flow from the valve 446 through a line 453 to the blind end of the motor 166.

The motor 202 is maintained in its idle position by pressurized air passing from the manifold 374 through a line 454, a valve 456 and a line 458 to the rod end of this motor. After the actuation of the motor 292 to urge the nozzles 274 outwardly against the upper margin 418, air enters the right side of the valve 456 through a pilot line 460 from a valve (not shown) to shift the valve 456. The shifting of the valve 456 enables pressurized air to flow from this valve through a line 462 to the blind end of the motor 202 to thus cause the motor 202 to raise the stop lug 212 and disengage it from the valve actuating rod 192, thus causing the valve 188 to close and enabling the motor 166 to again move the plate 162 and the nozzles 274 forwardly. During this resumption of the forward movement of the nozzles 274, they are resiliently urged downwardly against the insole 370 by the motors 304 and are resiliently urged outwardly against the upper margin 418 by the motor 292 so that they are bearing against the insole and the upper margin when they stop their forward motion as described below.

The shifting of the valve 456 also enables pressurized air to flow from the line 462 through a pilot line 464 to the left side of the valve 466 to shift the valve 466. The shifting of the valve 466 enables pressurized air to flow from a valve (not shown) through a pilot line 468, the valve 466 and a pilot line 469 to the left side of the valve 446. This does not, as yet, affect the valve 446 since air is still entering the right side of this valve through the pilot line 452. After a time delay caused by a flow control valve 470, pressurized air passes from the line 464 through a line 472 having the flow control valve therein to the left side of the valve 450, which is a spring return valve, to shift this valve to closed position and thus shut off the flow of pressurized air to the right side of the valve 446 through the pilot line 452. When the pressurized air in the pilot line 452 is shut off, the pressurized air in the pilot line 469 shifts the valve 446 back to its idle condition to thus cause pressurized air to again flow to the rod *end* of the motor 166 and to be shut off from the blind end of the motor 166 to cause the motor 166 to move the slide 162 and the nozzles 274 rearwardly.

From the foregoing it can be seen that, in response to the operation of the means for raising the stop lug 212 to enable the slide plate 162 and the nozzles 274 to resume their forward movement, the motor 166 is caused to reverse its movement and move the slide plate 162 and the nozzles 274 rearwardly after the lapse of *a* time period following the resumption of the forward movement of the slide *plate* 162 and the nozzles 274. The stop lug 212 is so located and the flow control valve 470 is so adjusted that the nozzles 274, at the conclusion of their forward movement, are located at the boundaries between the wiped toe portion of the upper margin and the unwiped side portions of the upper margin. Since the block 246, together with the nozzles 274, can swing about the axis of the post 248, the block, together with the nozzles, swing about this axis in one direction or the other should one nozzle arrive at this boundary before the other. The longitudinal or forward-rearward distance between the stop lug 212 and these boundaries will vary with the length of the shoe assembly. The flow control valve 470 is so set in relation to the speed of forward movement imparted to the nozzles 274 by the yieldable force of the pressurized air in the motor 166 that the nozzles 274 will arrive at the boundaries at about the same time as the motor 166 reverses at the nozzle movement for a shoe assembly having the greatest distance between the stop lug 212 and the boundaries. With the shoe assemblies having shorter distances between the stop lug 212 and the boundaries, the boundaries offer resistance to continued forward movement of the nozzles 274 under the yieldable forward force imparted to the nozzles by the motor 166 for the relatively short period of time between the arrival of the nozzles at the boundaries and the commencement of the rearward movement of the nozzles. This arrangement therefore ensures that without making any adjustments the nozzles will be at the boundaries when they commence their rearward movement regardless, within limits, of the longitudinal distance between the starting position where the stop lug 212 is located and the boundaries.

At the same time as the slide plate 162 and the nozzles 274 commence their rearward movement, pressurized air is caused to flow to the blind end of the motor 228 to thereby move the plunger 232 downwardly at a regulated speed past the orifice 222 and force cement through the passage means 276, the check valves 282 and the passages 278 in the nozzles 274 into the angle between the upper margin 418 and the insole 370.

The aforementioned opening of the valve 188 caused pressurized air to flow into the bottom of the cavity 324 by way of the coupled 332 to thereby raise the cylinder 322 to bring the stop surface 340 and the valve assembly 337 into intersecting relationship with the cam 352. At this time, the cam 352 is forward of the stop surface 340 and the valve assembly 337 so that it does not intersect them during the forward movement of the plate 162. The plate 162, together with the nozzles 274, continues its rearward movement until the cam 352 engages the stop surface 340 and engages the valve assembly 337 to thereby open the valve assembly 337. The stop surface 340 had been *so* located by the rotation of the shaft 314, in accordance with the dimensions of the shoe assembly 366 and the area of the heel portion of the upper margin that had been previously wiped against the insole, that when the nozzles 274 stop their rearward movement, due to the engagement of the cam 352 with the stop surface 340, the nozzles 274 are approximately at the boundary between the unwiped side portions of the upper margin 418 and the previously wiped heel portion of the upper margin.

During the rearward movement of the nozzles from the boundary of the unwiped side portion of the upper margin 418 with the previously wiped toe portion of the upper margin to the boundary of the unwiped side portions of the upper margin with the previously wiped heel portion of the upper margin, the cement is continuously being extruded from the nozzle passages 278 into the angle between the upper margin and the insole 370, the nozzles 274 are continuously being yieldably urged downwardly against the insole 370 by the motors 304, and the nozzles 274 are continuously being urged yieldably outwardly against the upper margin 418 by the motor 292, as shown in FIG. 21. Therefore, during the rearward cement extruding movement of the nozzles 274 they are able to remain in the angle between the insole 370 and the upper margin 418 in desirable positions for the extrusion of the cement regardless of the contour of the bottom of the insole and regardless of the contour of the insole periphery. During the rearward cement extruding movement of the nozzles 274, the block 246 and the nozzles 274 are still free to swing about the axis of the post 248 one way or the other to compensate for one nozzle arriving at the boundary between an unwiped side portion of the upper margin and the wiped heel portion of the upper margin before the other nozzle and thus provide the advantages discussed above in connection with the forward movement of the nozzles towards the boundary between the unwiped side portion of the upper margin and the wiped toe portion of the upper margin.

The relatively low back-up force exerted against the reentrant portion 422 on the right side of the shoe assembly to fold the lasting strap top segments 126b part way towards the insole forces the partially folded upper margin 418 on the right side of the shoe assembly against the periphery of the insole 370 to create a barrier between the upper margin and the insole that inhibits the creeping of the cement between the upper margin 418 and the insole and then between the upper 372 and the sides of the last 368. As noted in FIG. 21, the angle formed between the side of the last and the bottom of the last on the right side of the shoe assembly having the reentrant portion 422 is an acute angle which is smaller than the angle, which is close to a right angle, formed between the left side of the last and the bottom of the last. Therefore the need for folding the lasting strap top segments 126b on the right side of the last partway towards the insole does not exist with respect to the lasting segments 126b on the left side of the last. By not folding the upper margin 418 on the side of the shoe assembly 366 not having the reentrant portion 422, the nozzle 274 on that side of the shoe assembly may move further outwardly under the force imparted thereto by the motor 292 until it meets resistance from the upper margin 418 and thus be positioned close to and extrude cement close to the periphery of the insole 370 which enhances the quality of the bond between the upper margin and the insole effected by the wiping operation described below. It is for these reasons that the motors 142L were not actuated, as were the motors 142R, to force their piston rods 150 inwardly under relatively low pressure.

During the rearward cement applying movement of the nozzles 274 the lasting straps 126 are so pressed against the shoe assembly 366 that the points 152 are below the bottom of the insole 370 and the integral regions 153 extend above the bottom of the insole. This arrangement enables the lasting straps 126 to individually conform to the shape of the sides of the shoe assembly 366 while they are pressing the upper 372 against the last 368 in the FIG. 21 position and prevents the nozzles from snagging in the separation between the lasting straps 126 below the points 152 during the rearward cement applying movement of the nozzles 274 as well *as* during the forward movement of the nozzles. It has been found that a snagging of the nozzles 274 between the lasting straps 126 during the cement applying movement of the nozzles interferes with the smooth movement of the nozzles.

The opening of the valve assembly 337 causes:

a. the return of the motor 228 to its idle position to thereby cause the motor 228 to terminate the downward movement of the plunger 232 and raise this plunger to its idle position to terminate the extrusion of the cement through the nozzles 274;

b. the return of the motor 292 to its idle condition to thereby swing the nozzles 274 inwardly away from the upper margin 418;

c. the return of the motor 202 to its idle position to thereby lower the stop lug 212 to its idle position;

d. the return of the motors 304 to their idle positions to thereby raise the nozzles 274 to their idle positions; and e. the cutting off of the flow of pressurized air to the cylinder 322 to thereby enable the springs 326 to lower the cylinder 322 to its idle position to thereby lower the stop surface 340 out of intersecting relationship with the cam 352 and to thereby lower the valve assembly 337 away from the cam 352 so as to allow the valve assembly 337 to close.

The lowering of the stop surface 340 out of intersecting relationship with the cam 352 enables the motor 166 to resume the rearward movement of the plate 162 and the nozzles 274 until they reach their idle positions with the nozzles in a position to the rear of the shoe assembly so as to not interfere with the subsequent removal of the shoe assembly from the shoe support 43 and so that any cement that may drip from the nozzles will not fall on the shoe assembly.

Now pressurized air flows under higher pressure than that permitted by the pressure regulator 436 from a valve (not shown) through a line 474 (FIG. 19), a line 476, the shuttle valve 438 and the line 440 to the blind ends of the motors 142R. At the same time, the pressurized air flows from the line 474 through a line 478, a shuttle valve 480 and a line 482 to the blind ends of the motors 142L. This causes each motor 142 to force its piston rod 150 inwardly under relatively high pressure and thereby force the lasting strap top segment 126b inwardly over the insole periphery under relatively high pressure. This has the effect of forcing each lasting strap top segment 126b inwardly and downwardly to press the upper margin 418 against the insole 370. At this time, the rigid lasting strap bottom segments 126a are still clamping the top line 420 to the last, and the inward and downward force imparted to the lasting strap top segments 126b causes the lasting strap middle segment 126c to stretch, while the inner and outer presser straps 124 and 122 maintain their pressure against the shoe assembly 366, to thus force the portion of the upper 372 extending above the top line 420 upwardly and stretch the upper upwardly and tightly about the last while it is conforming to the shape of the last. The pressure applied by the presser straps 122 and 124 is light enough to allow this stretching of the lasting strap middle segments 126c to take place. The forcing down of each lasting strap top segment 126b against the insole causes the lasting strap top segment 126b to wipe or fold the upper margin 418 against the insole 370 and bond the upper margin to the insole by means of the previously applied cement.

This completes the machine cycle and the machine parts are now returned to their idle positions so that the lasted shoe assembly can be removed from the machine.

The above described cycle of operations was predicated on the inwardly and downwardly extending axes of the piston rods 150 intersecting the insole 370 inwardly of the insole periphery during the application of the relatively low back-up forces by the motors 142R and/or during the application of the relatively high wiping forces by the motors 142L and 142R. If the axis of a piston rod 150 intersects the shoe assembly 366 at a lower level than the periphery of the insole 370 when the backup force and/or wiping force is applied, the application of the back-up force and/or wiping force causes the lasting instrumentality 118 to rise upwardly of its bracket 82 about the axis of its pin 108 against the force of its spring 112 until the axis of the piston rod 150 intersects the bottom of the insole 370 inwardly of the insole periphery, after which the lasting strap top segment 126b is forced inwardly in the manner described above.

When operating on a right foot shoe assembly, the operator will start the machine cycle by momentarily depressing the right knob 364 (FIG. 1) to momentarily open valve 356R. This enables pressurized air to flow from the line 376 through a line 484, the valve 356R and a pilot line 486 to the left side of a valve 488 to shift the valve 488 to open position. The opening of the valve 488 enables pressurized air to flow from the line 384 through a line 490, the valve 488 and a line 492 to the motor 40R to thereby actuate the motor 40R. The actuation of the motor 40R causes its piston rod 42 to be projected leftwardly (FIG. 1) to thereby engage the mount 26 and swing the mount 26, together with the toe rest 32, leftwardly about the axis of the pin 28 until the cam 36 engages the left wing 34. The leftward swinging of the toe rest causes the toe end of the shoe assembly to swing leftwardly about the axis of the pin 28.

The aforementioned momentary opening, by the operator, of the valve 356R enables pressurized air to flow from the line 486 through a pilot line 494 to the left side of a valve 496 to shift this valve to open position. The opening of the valve 496 enables air at a higher pressure than that set by the regulator 396 to flow from the line 390 through a line 498, a valve 496, a line 500, the shuttle valve 406 and the line 408 to the blind end of the motor 256R to thus project the piston rod 258 of the motor 256R forwardly under a pressure that is higher than the pressure projecting the piston rod 258 of the motor 256L forwardly. As a result, the block 246 is swung clockwise (FIG. 8) about the axis of the post 248 so as to swing the nozzles 274 leftwardly as seen from the front of the machine (upwardly in FIG. 8).

At the same time as the motor 292 is actuated to move the nozzles 274 outwardly into engagement with the upper margin 418, the valve 496 is shifted to cut off the relatively high pressure air entering the motor 256R by way of the line 500.

In a right foot shoe assembly, the left side of the last has the reentrant portion 422. In operating on the right foot shoe assembly, the opening of the valve 430 in response to the opening of the valves 70 pursuant to the inward movement of the bases 64 enables pressurized air to pass from the valve 448 through a line 502, the valve 430, a line 504, a pressure regulator 506 set at the same relatively low pressure of the pressure regulator 436, the shuttle valve 480 and the line 482 to the blind ends of the motors 142L to thereby force the piston rods 150 of the motors 142L inwardly at a lower pressure than had been applied to the motors 88. The actuation of the motors 142L forces the associated lasting strap top segments 126b on the left side of the machine as seen in FIGS. 1 and 21 inwardly under the relatively low pressure of the pressure regulator 506 to provide the inwardly directed back-up force described above with respect to the left foot shoe assembly and to cause the upper margin 418 on the side of the right foot shoe assembly having the reentrant portion 422 to be folded downwardly part way towards the insole.

In a right foot shoe assembly, when the toe rest 32 is on the longitudinal center line of the machine, the right side of the shoe assembly (the lower side in FIG. 20A) projects further from the longitudinal center line of the machine than the left side of the shoe assembly (the upper side in FIG. 20A). Therefore, with the right foot shoe assembly and with the toe rest 32 located along the longitudinal center line of the machine, when the motors 60 have completed the inward movement of the lasting instrumentalities 118 due to engagement of the bolts 66 with the flanges 68, the lasting instrumentalities on the right side of the machine (FIG. 1) will be closer to their associated side of the shoe assembly 366 than the lasting instrumentalities on the left side of the shoe assembly. Therefore, the leftward swinging of the toe rest 32 and the nozzles 274, in operating on a right foot shoe assembly, enables the sides of the shoe assembly to be spaced the desired distance inwardly from the lasting instrumentalities 118 when the lasting instrumentalities have completed their inward movement pursuant to the operation of the motors 60. The leftward movement of the nozzles 274, in operating on a right foot shoe assembly, ensures that the nozzles engage the insole 370 inwardly of the upper margins 418 when the nozzles are lowered against the insole 370 by the motors 304.

In all other respects the machine cycle in operating on a right foot shoe assembly is identical to the above described machine cycle in operating on a left foot shoe assembly.

I claim:

1. In a lasting machine, operable on a shoe assembly formed of a last having an upper mounted thereon and an insole located on its bottom, for performing operations on the opposite side portions of the shoe assembly that includes engaging the shoe assembly and wiping the margins of selected opposite side portions of the upper against the corresponding portions of the insole, that comprises: support means for so supporting bottom-up the shoe assembly that the toe of the shoe assembly faces forwardly with said margin portions extending upwardly of the corresponding portions of the insole periphery; a base, mounted for inward-outward movement, located outward of and on each side of the support means; a lasting instrumentality mounted to each base for inward-outward movement; means so constructing each lasting instrumentality as to enable it, when it is moved inwardly of an outer position on its base, to perform said operations on its associated side portion of the shoe assembly; means for initially maintaining each base in an outer position with respect to the support means and for initially maintaining each lasting instrumentality in its outer position with respect to its associated base so that the shoe assembly may be placed on the support means; means for thereafter moving each base inwardly to an inner position wherein its associated lasting instrumentality is close to but not in engagement with the shoe assembly; and means for thereafter moving each lasting instrumentality inwardly of its outer position with respect to its associated base to cause it to perform said operations on the shoe assembly; the improvement wherein said support means comprises: means supporting the toe portion of the shoe assembly for lateral movement in two opposite lateral directions; and further comprising: means for selectively moving said toe portion laterally in one of the other of said lateral directions prior to the movement of the bases to their inner positions.

2. The mechanism of claim 1 wherein said means supporting the toe portion of the shoe assembly for lateral movement in said lateral directions comprises: a last pin adapted to be inserted into the back portion of the last so as to enable the last to swing laterally; and a toe rest assembly, adapted to support the vamp of the shoe assembly, located forwardly of the last pin, mounted for lateral movement; and wherein said means for selectively moving said toe portion laterally comprises: a rod, mounted for lateral movement, located on each side of the toe rest assembly; and means for selectively moving each of said rods into engagement with the toe rest assembly.

3. The mechanism of claim 2, further comprising: a plate located forwardly of the last pin; wherein said toe rest assembly comprises: a mount pivoted to the plate and extending forwardly thereof; a column fixed to and extending upwardly of the mount; and a toe rest fixed to the top of said column; further comprising: a pair of wings fixed to and extending forwardly of the plate on opposite sides of the mount; a motor mounted to each of said wings, each of said motors being so constituted as to have one of said rods as its driven element; and a cam secured to said mount in intersecting relationship with respect to said wings to thereby limit the extent of pivotal movement of the mount relative to the plate pursuant to selective inward movement of the rods; and wherein said means for selectively moving said rods comprises: means for selectively actuating said motors to selectively cause the motors to move their associated rods inwardly into engagement with said mount.

4. In the machine of claim 1 wherein the machine is so constructed that the lasting instrumentalities, when they are moved inwardly of said outer positions, first engage said margin portions and then wipe said margin portions against the corresponding portions of the insole; wherein the machine further comprises: *a plate mounted for movement in forward and rearward directions;* a block, located above the insole, mounted for movement in forward and rearward directions *in unison with the plate* and mounted for [lateral] movement *with respect to the plate* in two opposite [lateral] directions; a pair of nozzles mounted to the block for heightwise movement, [and] for lateral inward-outward movement *and for unitary movement in opposite lateral directions pursuant to said movement of the block with respect to the plate*; means for initially so locating the nozzles with respect to the block that they are in upper and inner positions with respect to the block; means for initially so locating the block that the nozzles are in prescribed forward-rearward positions; means for thereafter, and after the lasting instrumentalities have engaged said margin portions but before the lasting instrumentalities have wiped said margin portions, lowering the nozzles with respect to the block against the insole and for moving the nozzles outwardly with respect to the block into the corners between said margin portions and the corresponding portions of the insole periphery; means for thereafter moving the *plate and the* block, together with the nozzles, a prescribed distance in one of said forward and rearward directions while the nozzles continue to stay in said corners and for concomitantly extruding cement from the nozzles into said corners; means for thereafter moving the nozzles inwardly with respect to the block and inwardly of said corners and for raising the nozzles upwardly with respect to the block and upwardly of the insole; and means for thereafter causing the lasting instrumentalities to wipe said margin portions against the insole; the improvement comprising: means, operative prior to the lowering and outward movement of the nozzles while the nozzles remain in their inner positions with respect to the block, for *so* selectively moving the block [, together with] *with respect to the plates as to move* the nozzles [,] laterally in the same lateral direction in which said toe portion has been selectively laterally moved.

5. The combination of claim 4 wherein the machine further comprises: [ a plate mounted for movement in forward-rearward directions; and ] pivot means mounting the block to the plate for swinging movement about a heightwise axis that is located intermediate the lateral ends of the block; and wherein said means for selectively moving the block *with respect to the plate* comprises: means for selectively swinging the block one way or the other about said axis.

6. The combination of claim 5 wherein the machine further comprises: a pair of motors mounted to said plate, said motors having rods that, in response to actuation of the motors, are movable in paths that are in intersecting relationship with said block on opposite sides of said axis; and wherein said means for selectively moving the block comprises; means for selectively actuating one or the other of said motors.

7. A method of lasting, operable on a shoe assembly formed of a last having an upper mounted thereon and an insole located on its bottom, for wiping a first portion of the upper margin on a first side of the shoe assembly that has a relatively pronounced reentrant portion against the corresponding portion of the insole and for wiping a second portion of the upper margin on the second side of the shoe assembly that has a less pronounced reentrant portion against the corresponding portion of the insole comprising: supporting the shoe assembly bottom-up with said margin portions extending upwardly of the insole; locating a first lasting tool outwardly of said first margin portion; locating a second lasting tool outwardly of said second margin portion; folding only said first margin portion part way towards the insole by causing only the first lasting tool to apply a relatively light back-up force inwardly against the exterior surface of said first margin portion; thereafter moving a nozzle along each of the side peripheries of the insole and outwardly thereof to the extent permitted by said margin portions; extruding cement from the nozzles into the angles between the insole side peripheries and said margin portions during said movements of the nozzles; and thereafter folding said margin portions against the insole by causing both lasting tools to apply relatively heavy wiping forces inwardly against the exterior surfaces of said margin portions to thereby wipe said margin portions against the insole and attach them to the insole by way of said cement.

8. A lasting machine, operable on a shoe assembly formed of a last having an upper mounted thereon and an insole located on its bottom, for wiping the opposite side portions of the upper margin against the corresponding portions of the insole, one of the side portions of the shoe assembly having a relatively pronounced reentrant portion comprising: a support for supporting the shoe assembly bottom-up with said margin portions extending upwardly of the insole; a lasting tool located outwardly of the support on each side of the support, each lasting tool being mounted for movement between a first position wherein it extends outwardly of an associated one of said margin portions and upwardly of the corresponding portion of the insole and a second position wherein it extends downwardly and inwardly of its first position so as to wipe its associated margin portion against the insole; means for initially locating both lasting tools in their first positions; means for thereafter moving only a selected one of said lasting tools from its first position to an intermediate position between its first and second positions by applying a relatively light inwardly directed back-up force to said selected lasting tool so as to fold its associated margin portion, on the side of the shoe assembly having said relatively pronounced reentrant portion, part way toward the insole; said margin portions providing back-ups during the movements of cement applying nozzles along the sides of the insole periphery and outwardly thereof to the extent permitted by said margin portions; and means for thereafter, after a time interval sufficient to enable the nozzles to complete said nozzle movements, moving said selected lasting tool from its intermediate position to its second position and the non-selected lasting tool from its first position to its second position by applying relatively heavy inwardly directed wiping forces to the lasting tools so as to wipe said margin portions to the insole and attach them to the insole by way of the cement.

9. The lasting machine according to claim 8 further comprising: control means associated with each of said lasting tools; and means responsive to the actuation of each of said control means for causing its associated lasting tool to operate as aforesaid as the selected lasting tool.

10. A lasting machine, operable on a shoe assembly formed of a last having an upper mounted thereon and an insole located on its bottom, for wiping the opposite side portions of the upper margin against the corresponding portions of the insole, one of the side portions of the shoe assembly having a relatively pronounced reentrant portion, comprising: a support for supporting the shoe assembly bottom-up with said margin portions extending upwardly of the insole; a heightwise extending lasting strap located outwardly of the support on each side of the support; means for initially causing each lasting strap to engage the shoe assembly with a top segment of each lasting strap extending upwardly of the insole and outwardly of an associated one of said margin portions; means for thereafter folding only a selected one of said lasting strap top segments downwardly and inwardly part way towards the insole by applying an inward back-up force to said selected lasting strap top segment to thus fold its associated margin portion, on the side of the shoe assembly having said relatively pronounced reentrant portion, downwardly and inwardly part way towards the insole; said margin portions providing back-ups during the movements of cement applying nozzles along the sides of the insole periphery and outwardly thereof to the extent permitted by said margin portions; and means for thereafter, after a time interval sufficient to enable the nozzles to complete said nozzle movements, folding said selected lasting strap top segment further downwardly and inwardly against the insole and folding the nonselected lasting strap top segment downwardly and inwardly against the insole by applying inward wiping forces of a greater magnitude than said back-up force to said lasting strap top segments to thus wipe said upper margin portions against the insole and attach them to the insole by way of the cement.

11. The lasting machine according to claim 10 further comprising: control means associated with each of said lasting straps; and means responsive to the actuation of each of said control means for causing its associated lasting strap to operate as aforesaid as the selected lasting strap.

12. The lasting machine according to claim 10 wherein said means for applying said back-up force and said means for applying said wiping forces comprise: a drive rod, located outwardly of each of said top segments, mounted for inward-outward movement; a flexible connection between each drive rod and its associated top segment; means for initially maintaining both drive rods in outer positions; means for thereafter moving a selected drive rod, associated with the selected lasting strap top segment, inwardly under a relatively low pressure to thereby effect said back-up force; and means for thereafter moving said selected drive rod further inwardly and for moving the non-selected drive rod inwardly under relatively high pressures to thereby effect said wiping forces.

13. The lasting machine according to claim 12 further comprising: control means associated with each of said drive rods; and means responsive to the actuation of each of said control means for causing its associated drive rod to move inwardly under said relatively low pressure.

14. A lasting machine, operable on a shoe assembly formed of a last having an upper mounted thereon and an insole located on its bottom, for wiping a selected portion of the margin of the upper against the corresponding portion of the insole and cementatiously attaching said margin portion to said insole portion comprising: a support for supporting the shoe assembly bottom-up with said margin portion extending upwardly of the insole; a lasting instrumentality located outwardly of the support, the lasting instrumentality comprising at least two side by side heightwise extending lasting straps that are separated from each other from their bottoms up to a point and are formed into an integral region above the point; a nozzle, located above the shoe assembly mounted for movement lengthwise of the shoe assembly; means for causing the lasting instrumentality to so engage the shoe assembly that said straps below the point are pressed against the shoe assembly, that said point is no higher than the bottom of the insole and that said integral region extends upwardly of the insole and outwardly of said margin portion; means for thereafter applying a yieldable downward force and a yieldable outward force to the nozzle to cause the nozzle to bear against the insole and against said margin portion in the corner between the insole and said margin portion; means for thereafter moving the nozzle lengthwise of the shoe assembly while said yieldable downward and outward forces are maintained and for concomitantly extruding cement from the nozzle into said corner; means for thereafter moving the nozzle inwardly of said corner and for raising the nozzle upwardly of the insole; and means for thereafter folding that part of the lasting instrumentality integral region that extends above the insole downwardly and inwardly to thus wipe said margin portion against the insole and attach it to the insole by way of the cement.

* * * * *